(12) United States Patent
Daimon

(10) Patent No.: US 11,913,196 B2
(45) Date of Patent: Feb. 27, 2024

(54) WORK MACHINE AND SYSTEM INCLUDING WORK MACHINE

(71) Applicant: KOMATSU LTD., Tokyo (JP)

(72) Inventor: Masaki Daimon, Tokyo (JP)

(73) Assignee: KOMATSU LTD., Tokyo (JP)

( * ) Notice: Subject to any disclaimer, the term of this patent is extended or adjusted under 35 U.S.C. 154(b) by 898 days.

(21) Appl. No.: 16/961,811

(22) PCT Filed: Mar. 6, 2019

(86) PCT No.: PCT/JP2019/008915
§ 371 (c)(1),
(2) Date: Jul. 13, 2020

(87) PCT Pub. No.: WO2020/003618
PCT Pub. Date: Jan. 2, 2020

(65) Prior Publication Data
US 2021/0079626 A1    Mar. 18, 2021

(30) Foreign Application Priority Data

Jun. 29, 2018 (JP) ................. 2018-124696

(51) Int. Cl.
| | |
|---|---|
| *E02F 9/26* | (2006.01) |
| *E02F 3/28* | (2006.01) |
| *G01G 19/10* | (2006.01) |
| *G01G 19/52* | (2006.01) |
| *E02F 9/22* | (2006.01) |

(52) U.S. Cl.
CPC ............ *E02F 9/26* (2013.01); *E02F 3/283* (2013.01); *G01G 19/10* (2013.01); *G01G 19/52* (2013.01); *E02F 9/2296* (2013.01)

(58) Field of Classification Search
CPC ...................................................... E02F 9/26
See application file for complete search history.

(56) References Cited

U.S. PATENT DOCUMENTS

| | | | |
|---|---|---|---|
| 5,714,719 A | 2/1998 | Otsuka et al. | |
| 9,074,546 B2* | 7/2015 | Asami | E02F 9/225 |
| 9,938,692 B2* | 4/2018 | Shatters | E02F 9/264 |
| 10,724,206 B2* | 7/2020 | Tsuji | E02F 9/2271 |
| 2008/0169131 A1 | 7/2008 | Takeda et al. | |
| 2013/0041561 A1 | 2/2013 | Asami et al. | |
| 2017/0191245 A1 | 7/2017 | Shatters et al. | |
| 2018/0142442 A1 | 5/2018 | Tsuji | |

(Continued)

FOREIGN PATENT DOCUMENTS

| | | |
|---|---|---|
| CN | 101788398 A | 7/2010 |
| CN | 107273695 A | 10/2017 |
| EP | 0229083 A | 7/1987 |

(Continued)

OTHER PUBLICATIONS

English translation of Written Opinion of International Searching Authority dated May 28, 2019 for PCT/JP2019/008915.

*Primary Examiner* — Michael A Berns
(74) *Attorney, Agent, or Firm* — Faegre Drinker Biddle & Reath LLP

(57) ABSTRACT

Based on information sensed by a work phase sensing unit, a work phase by a work implement is distinguished. Correction of boom pressure is switched when distinction of excavation in the work phase is switched.

24 Claims, 13 Drawing Sheets

(56) References Cited

U.S. PATENT DOCUMENTS

2021/0079626 A1* 3/2021 Daimon ................ G01G 19/08

FOREIGN PATENT DOCUMENTS

| | | |
|---|---:|---:|
| JP | S63-128429 U | 8/1988 |
| JP | H06-010378 A | 1/1994 |
| JP | 2001-099701 A | 4/2001 |
| JP | 2006-336390 A | 12/2006 |
| JP | 2015-040422 A | 3/2015 |
| WO | WO 86/07399 A1 | 12/1986 |
| WO | WO-2006/098218 A1 | 9/2006 |

* cited by examiner

WORK MACHINE AND SYSTEM INCLUDING WORK MACHINE

TECHNICAL FIELD

The present disclosure relates to a work machine and a system including the work machine.

BACKGROUND ART

An amount of production is important in managing productivity and fuel efficiency of a wheel loader. A load weight is also important in obtaining the information about the amount of production. The technique of measuring the load weight in the wheel loader is disclosed in Japanese Patent Laying-Open No. 2001-99701 (PTL 1), for example.

In the above-mentioned literature, the load weight in a bucket is measured by the operation of raising a boom after excavation. Also, the load weight is measured a prescribed number of times from the time when the boom starts to rise to the time when the boom stops.

CITATION LIST

Patent Literature

PTL 1: Japanese Patent Laying-Open No. 2001-99701

SUMMARY OF INVENTION

Technical Problem

When excavation and loading onto a dump truck is performed in a plurality of separate steps, an excess of the weight loaded onto the dump truck needs to be avoided. Thus, for last loading onto a dump truck, after excavation, the load weight in a bucket needs to be adjusted to be smaller than the difference between the loading capacity of the dump truck and the current loaded weight in the dump truck.

In the method of measuring a load weight disclosed in the above-mentioned literature, at the time point when it is sensed that the load in the bucket exceeds the loading capacity of the dump truck, the wheel loader has already traveled to the position away from the excavation site. Thus, if the wheel loader goes back to the excavation site and unloads a part of the load in the bucket and again measures the load weight for loading onto the dump truck, the work time is increased.

Furthermore, when it is sensed that the load in the bucket exceeds the loading capacity of the dump truck, the load needs to be loaded onto the dump truck while leaving a part of the load in the bucket in accordance with the above-mentioned difference so as not to exceed the loading capacity of the dump truck, which is difficult even for a skillful operator.

In the case where the load weight is measured by the operation of raising a boom after excavation as disclosed in the above-mentioned literature, when the traveling distance is relatively long, the attitude becomes unstable in the state where the boom is kept raised. Thus, the boom needs to be lowered once, with the result that the operator's operation becomes complicated.

An object of the present disclosure is to provide a work machine and a system including the work machine, by which a load weight can be measured in a short work time period by a simple operation.

Solution to Problem

A work machine according to the present disclosure includes a work implement, a work phase sensing unit, a cylinder pressure sensing unit, and a controller. The work implement includes a bucket, a boom that raises and lowers the bucket, and a work tool cylinder that drives at least one of the bucket and the boom. The work phase sensing unit senses information about a work phase including excavation. The cylinder pressure sensing unit senses cylinder pressure of the work tool cylinder. The controller distinguishes the work phase by the work implement based on the information sensed by the work phase sensing unit. The controller switches correction of the cylinder pressure sensed by the cylinder pressure sensing unit when distinction of excavation in the work phase switches.

Advantageous Effects of Invention

The present disclosure can implement a work machine and a system including the work machine, by which a load weight can be measured in a short work time period by a simple operation.

DESCRIPTION OF EMBODIMENTS

Figure 1:
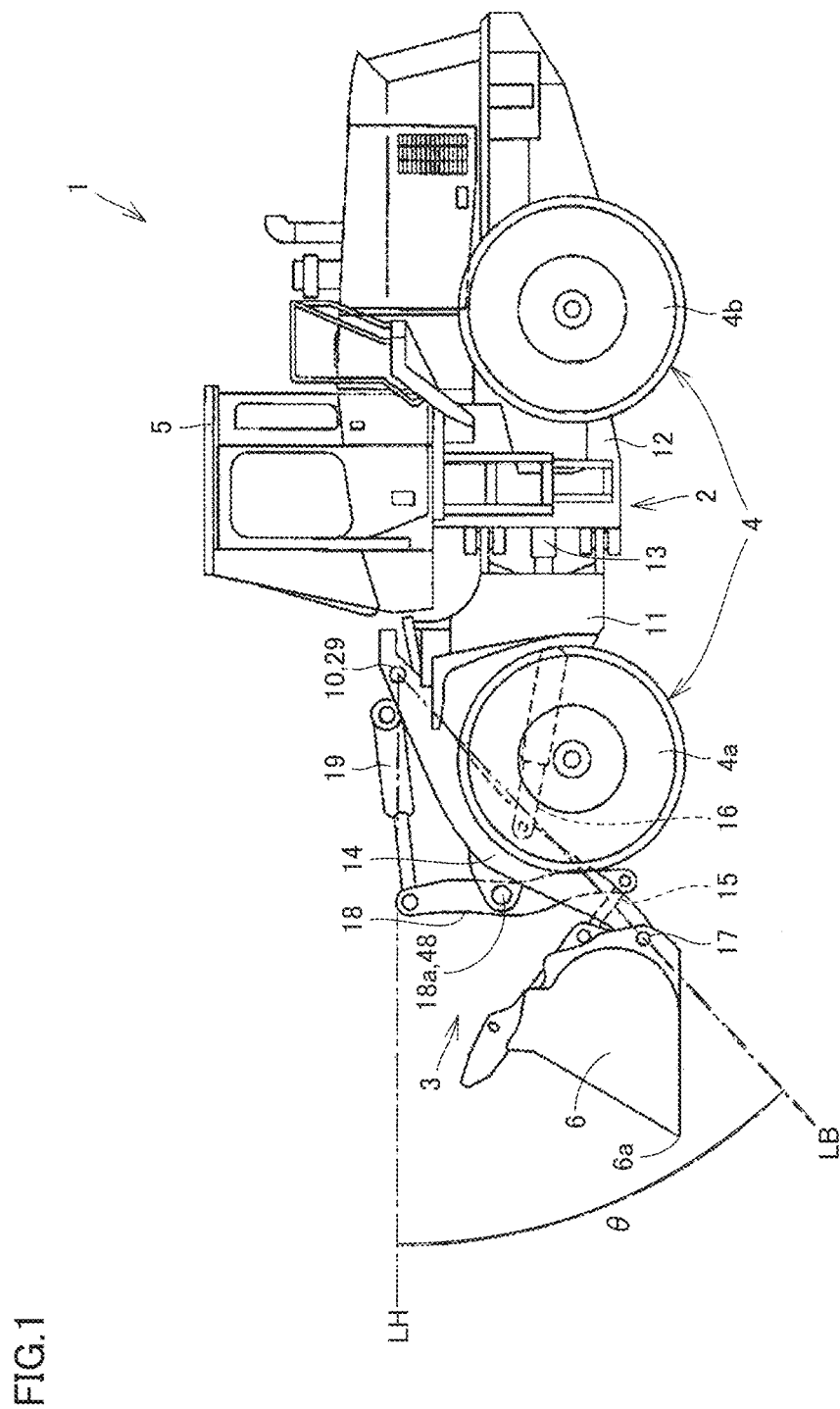
FIG. 1 is a side view of a wheel loader as an example of a work machine according to an embodiment.

The embodiments will be hereinafter described with reference to the accompanying drawings. In the following description, the same components will be designated by the same reference characters. Names and functions thereof are also the same. Accordingly, the detailed description thereof will not be repeated.

<Overall Configuration>

In the embodiment, a wheel loader 1 will be described as an example of a work machine. FIG. 1 is a side view of wheel loader 1 as an example of the work machine according to the embodiment.

As shown in FIG. 1, wheel loader 1 includes a vehicular body frame 2, a work implement 3, a traveling unit 4, and a cab 5. Vehicular body frame 2, cab 5 and the like constitute a vehicular body of wheel loader 1. Work implement 3 and traveling unit 4 are attached to the vehicular body of wheel loader 1.

Traveling unit 4 cause the vehicular body of wheel loader 1 to travel and includes running wheels 4a and 4b. Wheel loader 1 is movable as running wheels 4a and 4b are rotationally driven and can perform a desired work using work implement 3.

Vehicular body frame 2 includes a front frame 11 and a rear frame 12. Front frame 11 and rear frame 12 are attached to each other so as to be swingable in a left-right direction. A steering cylinder 13 is attached to front frame 11 and rear frame 12. Steering cylinder 13 is a hydraulic cylinder. As steering cylinder 13 extends and contracts by hydraulic oil from a steering pump (not shown), the traveling direction of wheel loader 1 is laterally changed.

In the present specification, the direction in which wheel loader 1 travels straightforward is referred to as a front-rear direction of wheel loader 1. In the front-rear direction of wheel loader 1, the side where work implement 3 is located with respect to vehicular body frame 2 is referred to as a frontward direction, and the side opposite to the frontward direction is referred to as a rearward direction. The left-right direction of wheel loader 1 is orthogonal to the front-rear direction as seen in a plan view. The right side and the left side in the left-right direction in facing forward are defined as a right direction and a left direction, respectively. A top-bottom direction of wheel loader 1 is orthogonal to a plane defined by the front-rear direction and the left-right direction. In the top-bottom direction, the ground side is defined as a lower side and the sky side is defined as an upper side.

Work implement 3 and running wheel (front wheel) 4a are attached to front frame 11. Work implement 3 includes a boom 14 as a work tool and a bucket 6. A base end of boom 14 is rotatably attached to front frame 11 by a boom pin 10. Bucket 6 is rotatably attached to boom 14 by a bucket pin 17 located at a tip end of boom 14. Front frame 11 and boom 14 are coupled to each other by a boom cylinder 16. Boom cylinder 16 is a hydraulic cylinder and also is a work tool cylinder. As boom cylinder 16 extends and contracts by hydraulic oil from a work implement pump 25 (see FIG. 2), boom 14 is raised and lowered. Boom cylinder 16 drives boom 14.

Work implement 3 further includes a bell crank 18, a tilt cylinder 19 and a tilt rod 15. Bell crank 18 is rotatably supported on boom 14 by a support pin 18a located substantially in the center of boom 14. Tilt cylinder 19 couples a base end of bell crank 18 to front frame 11. Tilt rod 15 couples a tip end of bell crank 18 to bucket 6. Tilt cylinder 19 is a hydraulic cylinder and also is a work tool cylinder. As tilt cylinder 19 extends and contracts by hydraulic oil from work implement pump 25 (see FIG. 2), bucket 6 pivots upward and downward. Tilt cylinder 19 drives bucket 6.

Cab 5 and running wheel (rear wheel) 4b are attached to rear frame 12. Cab 5 is disposed behind boom 14. Cab 5 is placed on vehicular body frame 2. A seat on which the operator sits, an operation apparatus and the like are arranged in cab 5.

Figure 2:
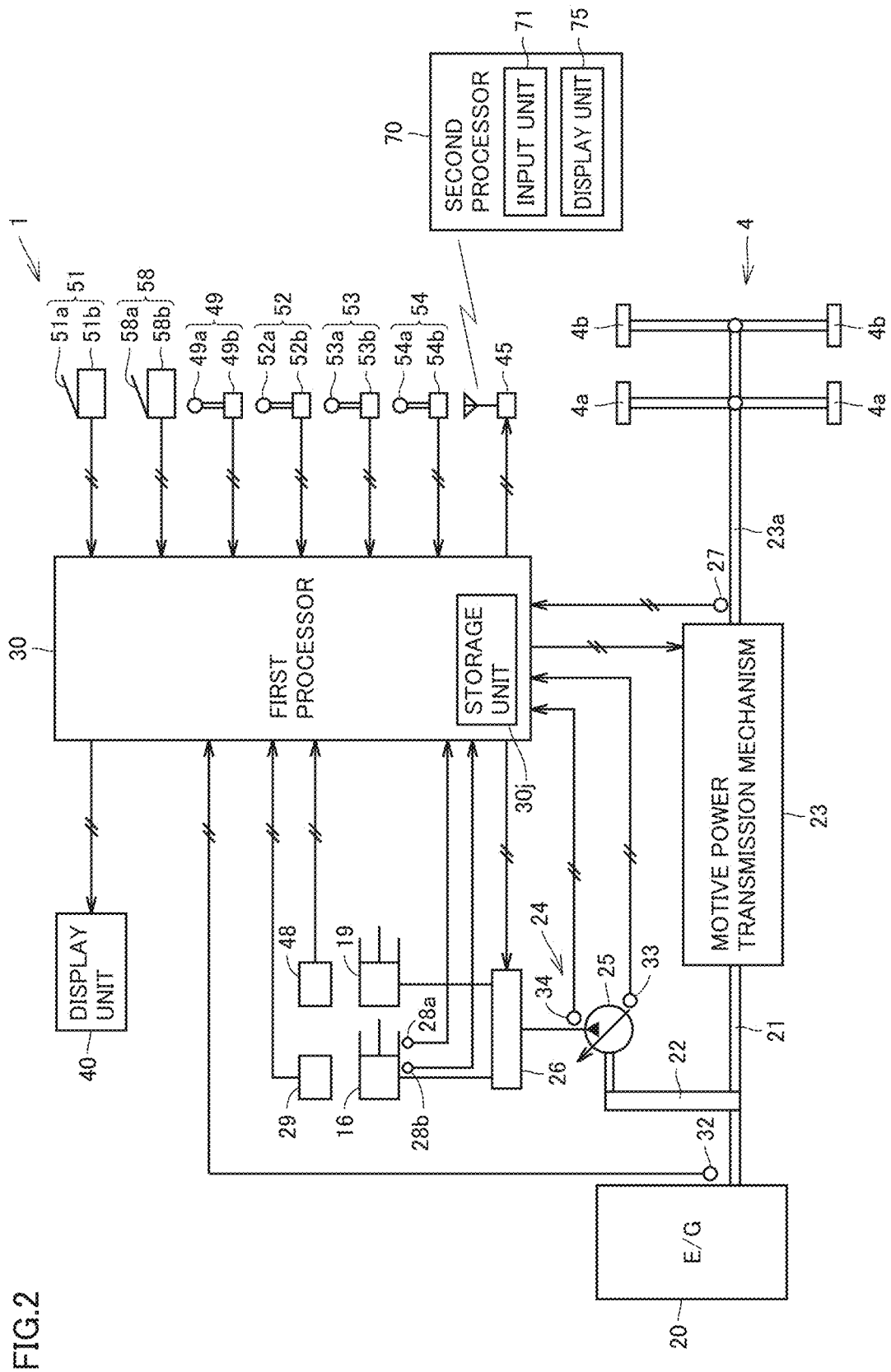
FIG. 2 is a schematic block diagram of the wheel loader.

FIG. 2 is a schematic block diagram showing the configuration of wheel loader 1. Wheel loader 1 includes an engine 20, a motive power extraction unit 22, a motive power transmission mechanism 23, a cylinder driving unit 24, a first angle detector 29, a second angle detector 48, and a first processor 30 (controller).

Engine 20 is, for example, a diesel engine. In place of engine 20, a motor driven by a power storage unit may be used, or both an engine and a motor may be used. An output from engine 20 is controlled by adjusting the amount of fuel to be injected into a cylinder of engine 20. Rotation sensor 32 detects the rotation speed of the rotation shaft inside engine 20 and outputs a signal of the detected rotation speed to first processor 30.

Motive power extraction unit 22 is an apparatus that distributes the output from engine 20 to motive power transmission mechanism 23 and cylinder driving unit 24.

Motive power transmission mechanism 23 is a mechanism that transmits the driving force from engine 20 to front wheel 4a and rear wheel 4b, and serves as a transmission, for example. Motive power transmission mechanism 23 changes the speed of rotation of an input shaft 21 and outputs the resultant rotation to an output shaft 23a.

A vehicle speed detection unit 27 for detecting a vehicle speed of wheel loader 1 is attached to output shaft 23a of motive power transmission mechanism 23. Wheel loader 1 includes vehicle speed detection unit 27. Vehicle speed detection unit 27 is a vehicle speed sensor, for example. Vehicle speed detection unit 27 detects the rotation speed of output shaft 23a, thereby detecting a movement speed of wheel loader 1 by traveling unit 4. Vehicle speed detection unit 27 functions as a rotation sensor that detects the rotation speed of output shaft 23a. Vehicle speed detection unit 27 functions as a movement detector that detects the movement by traveling unit 4. Vehicle speed detection unit 27 outputs a detection signal showing the vehicle speed of wheel loader 1 to first processor 30.

Cylinder driving unit 24 includes work implement pump 25 and a control valve 26. The output from engine 20 is transmitted to work implement pump 25 through motive power extraction unit 22. The hydraulic oil discharged from work implement pump 25 is supplied to boom cylinder 16 and tilt cylinder 19 through control valve 26.

A sensor 33 detects the angle of a swash plate of work implement pump 25, and outputs a signal of the detected swash plate angle to first processor 30. A pressure sensor 34 detects the pressure discharged from work implement pump 25, and outputs a signal of the detected discharged pressure to first processor 30.

First hydraulic pressure detectors 28a and 28b that detect hydraulic pressure in an oil chamber of boom cylinder 16 are attached to boom cylinder 16. Wheel loader 1 includes first hydraulic pressure detectors 28a and 28b. First hydraulic pressure detectors 28a and 28b include a pressure sensor 28a for detecting head pressure, and a pressure sensor 28b for detecting bottom pressure, for example.

Pressure sensor 28a is attached to the head side of boom cylinder 16. Pressure sensor 28a can detect the pressure (head pressure) of the hydraulic oil in the cylinder-head-side oil chamber of boom cylinder 16. Pressure sensor 28a outputs a detection signal showing the head pressure of boom cylinder 16 to first processor 30.

Pressure sensor 28b is attached to the bottom side of boom cylinder 16. Pressure sensor 28b can detect the pressure (bottom pressure) of the hydraulic oil in the cylinder-bottom-side oil chamber of boom cylinder 16. Pressure sensor 28b outputs a detection signal showing the bottom pressure of boom cylinder 16 to first processor 30.

First angle detector 29 is, for example, a potentiometer attached to boom pin 10. First angle detector 29 detects a boom angle showing a lift angle (tilt angle) of boom 14. First angle detector 29 outputs a detection signal showing the boom angle to first processor 30.

Specifically, as shown in FIG. 1, a boom angle θ refers to an angle of a straight line LB extending in the direction from the center of boom pin 10 toward the center of bucket pin 17, with respect to a horizontal line LH extending forward from the center of boom pin 10. In the case where straight line LB is horizontal, boom angle θ=0°. In the case where straight line LB is located above horizontal line LH, boom angle θ is positive. In the case where straight line LB is located below horizontal line LH, boom angle θ is negative.

First angle detector 29 may be a stroke sensor disposed in boom cylinder 16.

Second angle detector 48 is, for example, a potentiometer attached to support pin 18a. Second angle detector 48 detects an angle of bell crank 18 (bell crank angle) with respect to boom 14, thereby detecting a bucket angle showing a tilt angle of bucket 6 with respect to boom 14. Second angle detector 48 outputs a detection signal showing the bucket angle to first processor 30. The bucket angle is, for example, an angle formed between straight line LB and a straight line that connects the center of bucket pin 17 and a cutting edge 6a of bucket 6.

Second angle detector 48 may be a stroke sensor disposed in tilt cylinder 19.

As shown in FIG. 2, wheel loader 1 includes, in cab 5, an operation apparatus operated by the operator. The operation apparatus includes a forward and rearward movement switching apparatus 49, an accelerator operation apparatus 51, a boom operation apparatus 52, a speed change operation apparatus 53, a bucket operation apparatus 54, and a brake operation apparatus 58.

Forward and rearward movement switching apparatus 49 includes a forward and rearward movement switching operation member 49a and a forward and rearward movement switching detection sensor 49b. Forward and rearward movement switching operation member 49a is operated by the operator to give an instruction to switch the movement of the vehicle between forward movement and rearward movement. Forward and rearward movement switching operation member 49a can be switched to each of a forward movement (F) position, a neutral (N) position and a rearward movement (R) position. Forward and rearward movement switching detection sensor 49b detects the position of forward and rearward movement switching operation member 49a. Forward and rearward movement switching detection sensor 49b outputs, to first processor 30, a detection signal (forward movement, neutral, rearward movement) of the forward and rearward movement command indicated by the position of forward and rearward movement switching operation member 49a. Forward and rearward movement switching apparatus 49 includes a forward and rearward movement switching lever that can perform switching among forward movement (F), neutral (N) and rearward movement (R).

Accelerator operation apparatus 51 includes an accelerator operation member 51a and an accelerator operation detection unit 51b. Accelerator operation member 51a is operated by the operator to set any one of rotation of engine 20, outputs such as torque. Accelerator operation detection unit 51b detects an amount of operation (amount of accelerator operation) of accelerator operation member 51a. Accelerator operation detection unit 51b outputs a detection signal showing the amount of accelerator operation to first processor 30.

Brake operation apparatus 58 includes a brake operation member 58a and a brake operation detection unit 58b. Brake operation member 58a is operated by the operator to control the deceleration force of wheel loader 1. Brake operation detection unit 58b detects an amount of operation (amount of brake operation) of brake operation member 58a. Brake operation detection unit 58b outputs a detection signal showing the amount of brake operation to first processor 30. The pressure of brake oil may be used as the amount of brake operation.

Boom operation apparatus 52 includes a boom operation member 52a and a boom operation detection unit 52b. Boom operation member 52a is operated by the operator to raise or lower boom 14. Boom operation detection unit 52b detects the position of boom operation member 52a. Boom operation detection unit 52b outputs, to first processor 30, a detection signal of the command to raise or lower boom 14, which is indicated by the position of boom operation member 52a.

Speed change operation apparatus 53 includes a speed change operation member 53a and a speed change operation detection unit 53b. Speed change operation member 53a is operated by the operator to control a speed change from input shaft 21 to output shaft 23a in motive power transmission mechanism 23. Speed change operation detection unit 53b detects the position of speed change operation member 53a. Speed change operation detection unit 53b outputs, to first processor 30, the detection command for a speed change indicated by the position of speed change operation member 53a.

Bucket operation apparatus 54 includes a bucket operation member 54a and a bucket operation detection unit 54b. Bucket operation member 54a is operated by the operator to cause bucket 6 to perform an excavation operation or a dumping operation. Bucket operation detection unit 54b detects the position of bucket operation member 54a. Bucket operation detection unit 54b outputs, to first processor 30, a detection signal of the command to operate bucket 6 in a tilting back direction or a dumping direction, which is indicated by the position of bucket operation member 54a.

First processor 30 is implemented by a microcomputer including a storage device such as a random access memory (RAM) and a read only memory (ROM), and a computing device such as a central processing unit (CPU). First processor 30 may be implemented as a part of the function of the controller of wheel loader 1 that controls the operations of engine 20, work implement 3 (boom cylinder 16, tilt cylinder 19 and the like), motive power transmission mechanism 23, display unit 40, and the like.

Wheel loader 1 further includes a display unit 40 and an output unit 45. Display unit 40 is implemented by a monitor disposed in cab 5 and viewed by the operator. Display unit 40 shows the transportation work information measured by first processor 30.

Output unit 45 outputs the transportation work information to a server (second processor 70 (a controller)) placed outside wheel loader 1. Output unit 45 may, for example, have a communication function such as wireless communication to communicate with an input unit 71 of second processor 70. Alternatively, output unit 45 may, for example, be an interface of a portable storage device (such as a memory card) that can be accessed by input unit 71 of second processor 70. Second processor 70 includes a display unit 75 corresponding to a monitor function, and can cause display unit 75 to show the transportation work information output from output unit 45. Second processor 70 is implemented by a microcomputer including a storage device such as an RAM and an ROM, and a computing device such as a CPU, like first processor 30.

First angle detector 29, second angle detector 48, first hydraulic pressure detectors 28a, 28b, forward and rearward movement switching detection sensor 49b, boom operation detection unit 52b, and bucket operation detection unit 54b are included in the work phase sensing unit. The work phase sensing unit senses the information about the work phase of work implement 3.

The work phase includes unloaded forward movement, excavation, loaded rearward movement, loaded forward movement, soil ejection, rearward movement and boom lowering, and simple traveling, for example.

Also, the information about the work phase of work implement 3 includes information about a detection signal of a forward and rearward movement command indicated by the position of forward and rearward movement switching operation member 49a (forward movement, neutral, rearward movement), a detection signal of an operation command for boom 14 (raising, neutral, lowering), a detection signal of an operation command for bucket 6 (dumping, neutral, tilt back), and a pressure detection signal for boom cylinder 16 (the differential pressure between the head pressure and the bottom pressure).

The work phase and the information about the work phase of work implement 3 will be described later in detail with reference to FIG. 7.

Rotation sensor 32, sensor 33, pressure sensor 34, accelerator operation detection unit 51b, and the like are included in a traction sensing unit. The traction sensing unit senses the information about the traction of traveling unit 4.

<Functional Blocks in First Processor 30>

First processor 30 shown in FIG. 2 has a function of distinguishing the work phase by work implement 3 based on the information sensed by the above-mentioned work phase sensing unit. First processor 30 has a function of switching correction of the boom pressure (that is, the differential pressure between the head pressure detected by pressure sensor 28a and the bottom pressure detected by pressure sensor 28b, more specifically, an output value obtained after a smoothing process) when distinction of excavation in the work phase is switched.

Furthermore, first processor 30 has a function of correcting the boom pressure to calculate the corrected pressure of the boom cylinder when it distinguishes the work phase as excavation. First processor 30 has a function of calculating the load weight in bucket 6 based on the above-mentioned corrected pressure.

Furthermore, first processor 30 has a function of calculating traction pressure included in the boom pressure based on the information about the traction sensed by traction sensing units 32 to 34 and 51b. First processor 30 has a function of subtracting the above-mentioned traction pressure from the boom pressure to correct the boom pressure to calculate the corrected pressure of the boom cylinder. First processor 30 has a function of calculating the instantaneous load in bucket 6 based on the above-mentioned corrected pressure.

In the following, the functional blocks in first processor 30 having the above-described functions will be described.

Figure 3:
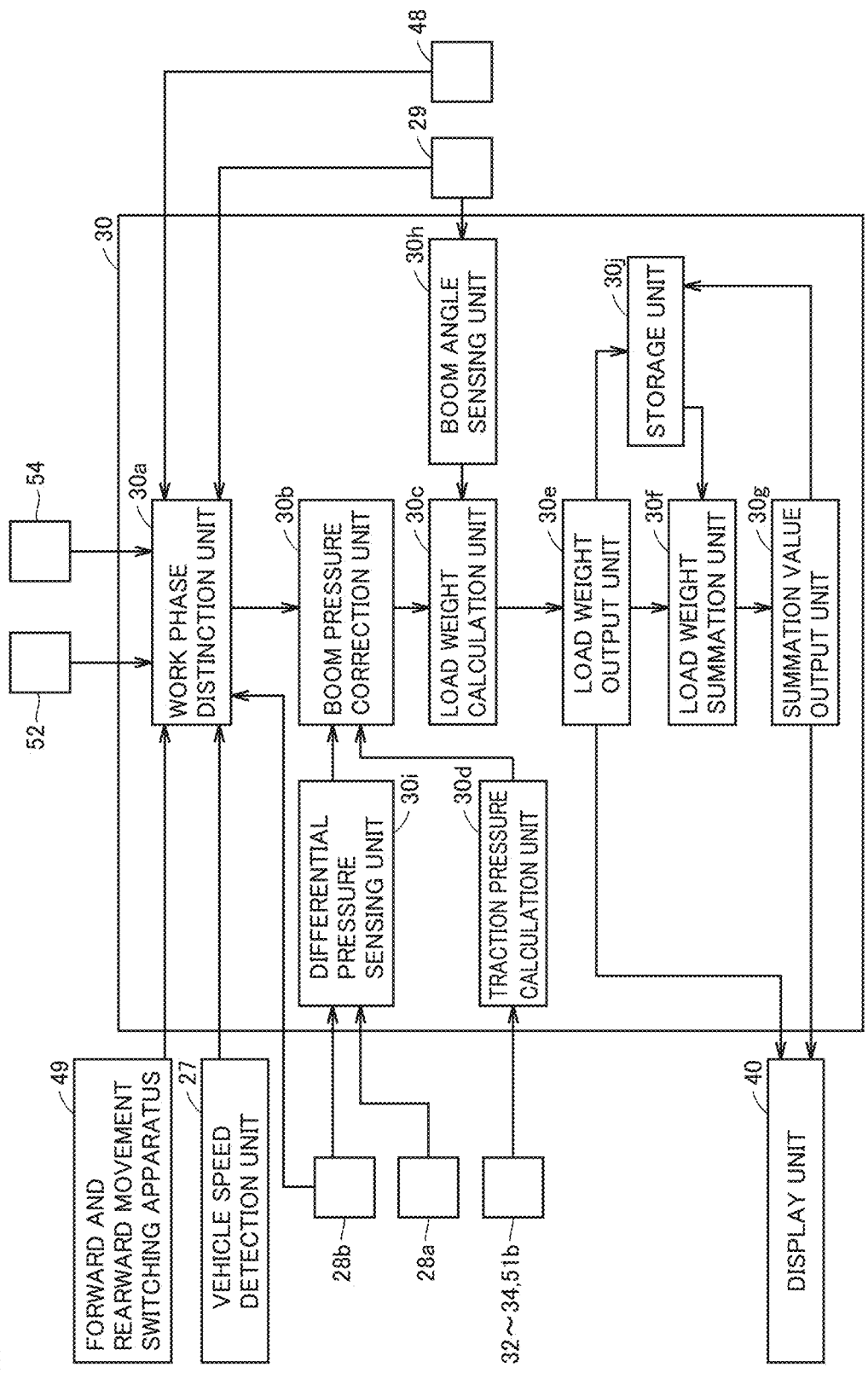
FIG. 3 shows functional blocks in a first processor.

FIG. 3 is a diagram showing functional blocks in the first processor. As shown in FIG. 3, first processor 30 mainly includes a work phase distinction unit 30a, a boom pressure correction unit 30b, a load weight calculation unit 30c, a traction pressure calculation unit 30d, a load weight output unit 30e, a load weight summation unit 30f, a summation value output unit 30g, a boom angle sensing unit 30h, a differential pressure sensing unit 30i, and a storage unit 30j, for example.

Work phase distinction unit 30a distinguishes the work phase of work implement 3. Work phase distinction unit 30a obtains the information about the work phase of work implement 3 that is sensed by the work phase sensing unit. By way of example, work phase distinction unit 30a obtains a detection signal of the forward and rearward movement command output from forward and rearward movement switching apparatus 49, a detection signal of the operation command for boom 14 output from boom operation apparatus 52, a detection signal of the operation command for bucket 6 output from bucket operation apparatus 54, and a pressure detection signal for boom cylinder 16 output from pressure sensor 28b.

Figure 7:
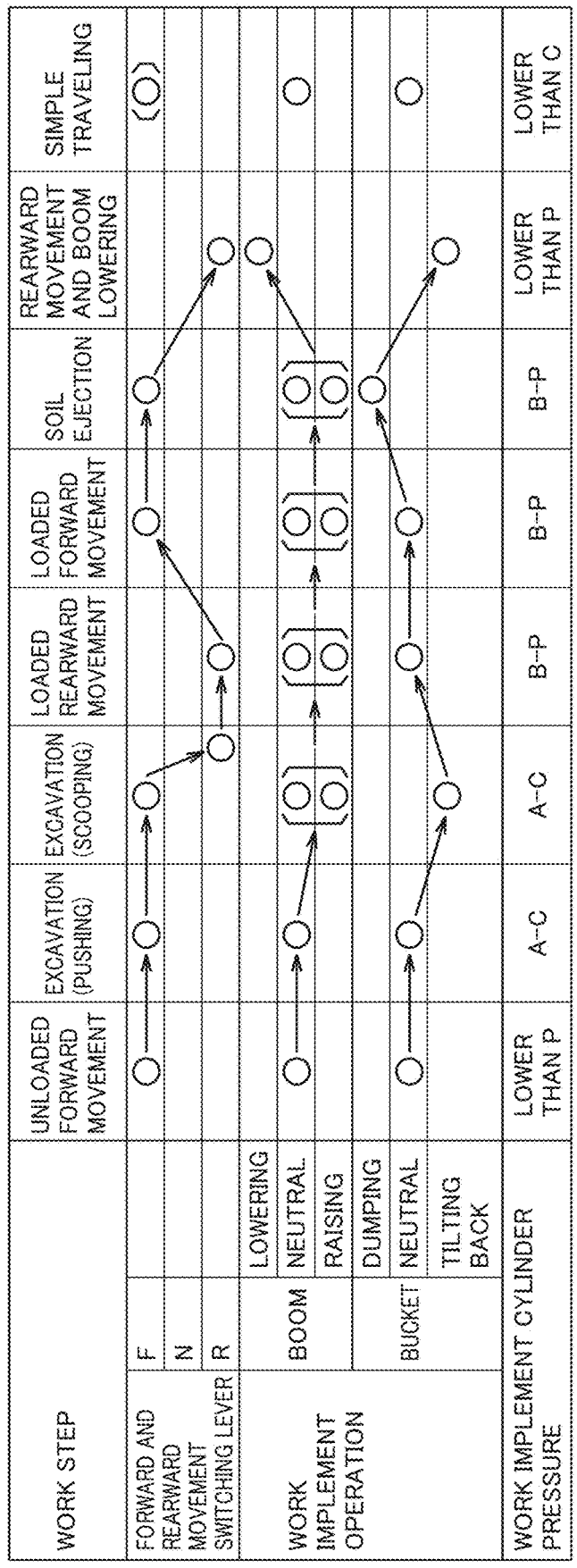
FIG. 7 is a table showing a determination method in the series of steps such as an excavation work and a loading work by the wheel loader.

Based on the obtained information about the work phase, work phase distinction unit 30a distinguishes the work phase while referring to a table shown in FIG. 7. This distinction of the work phase will be described later in detail with reference to FIG. 7.

Work phase distinction unit 30a outputs a signal showing the distinguished work phase to boom pressure correction unit 30b.

Differential pressure sensing unit 30i calculates a differential pressure between the head pressure and the bottom pressure of boom cylinder 16, based on the detection signal showing the head pressure of boom cylinder 16 that is output from pressure sensor 28a and the detection signal showing the bottom pressure of boom cylinder 16 that is output from pressure sensor 28b. Furthermore, differential pressure sensing unit 30i performs a process of smoothing the calculated differential pressure. The smoothing process is a method of summing and averaging values including values detected in the past and can be performed also by a low pass filter and the like. Differential pressure sensing unit 30i outputs the signal of the differential pressure (the signal of the boom pressure) that has been smoothed to boom pressure correction unit 30b.

Traction pressure calculation unit 30d calculates traction pressure based on: the rotation speed of the rotation shaft inside engine 20 detected by rotation sensor 32; the angle of the swash plate of work implement pump 25 detected by sensor 33; the discharge pressure from work implement pump 25 detected by pressure sensor 34; the amount of operation in accelerator operation member 51a detected by accelerator operation detection unit 51b; and the like. Traction pressure calculation unit 30d outputs the signal of the calculated traction pressure to boom pressure correction unit 30b.

Boom pressure correction unit 30b obtains a signal showing the work phase output from work phase distinction unit 30a, a signal of the boom pressure output from differential pressure sensing unit 30i, and a signal of the traction pressure output from traction pressure calculation unit 30d. When the work phase distinguished by work phase distinction unit 30a is excavation, boom pressure correction unit 30b corrects the boom pressure to calculate the corrected pressure of boom cylinder 16.

Correction of the boom pressure will be described later in detail with reference to FIGS. 10 and 11.

The signal of the above-mentioned corrected pressure calculated by boom pressure correction unit 30b is output to load weight calculation unit 30c.

Load weight calculation unit 30c calculates the load weight (or the instantaneous load) in bucket 6 based on the boom angle signal output from boom angle sensing unit 30h and the signal of the above-mentioned corrected pressure calculated by boom pressure correction unit 30b.

Boom angle sensing unit 30h receives the detection signal showing the boom angle that is output from first angle detector 29, calculates a boom angle, and outputs a signal of the calculated boom angle to load weight calculation unit 30c.

The method of calculating the load weight (or the instantaneous load) by load weight calculation unit 30c will be described later in detail with reference to FIGS. 4 and 5. The signal of the load weight (or the instantaneous load) in bucket 6 calculated by load weight calculation unit 30c is output to load weight output unit 30e.

Load weight output unit 30e outputs the signal of the load weight (or the instantaneous load) calculated by load weight calculation unit 30c to load weight summation unit 30f, storage unit 30j and display unit 40. Storage unit 30j stores the load weight output from load weight output unit 30e. Display unit 40 shows the load weight or the instantaneous load on a screen and the like. Load weight output unit 30e may also output the signal of the load weight (or the instantaneous load) to output unit 45 (FIG. 2). The signal of the load weight (or the instantaneous load) output to output unit 45 may be output to second processor 70 and displayed on display unit 75 of second processor 70. As described above, each of display units 40 and 75 shows the load in the bucket.

Load weight summation unit 30f receives the signal of the load weight from load weight output unit 30e, and adds the current load weight to the previous load weights stored in storage unit 30j. Load weight summation unit 30f outputs a signal of a summation value of the summed load weights to summation value output unit 30g.

Summation value output unit 30g receives the summation value signal from load weight summation unit 30f, and outputs the summation value signal obtained by summation in load weight summation unit 30f to storage unit 30j and display unit 40. Storage unit 30j stores the summation value of the load weights output from summation value output unit 30g. Display unit 40 shows the summation value of the load weights on the screen and the like. Summation value output unit 30g may also output the summation value signal to output unit 45 (FIG. 2). The summation value signal output to output unit 45 may be output to second processor 70 and shown on display unit 75 of second processor 70.

<Method of Calculating Instantaneous Load>

Then, an outline of a method of calculating an instantaneous load will be first described.

Figure 4:
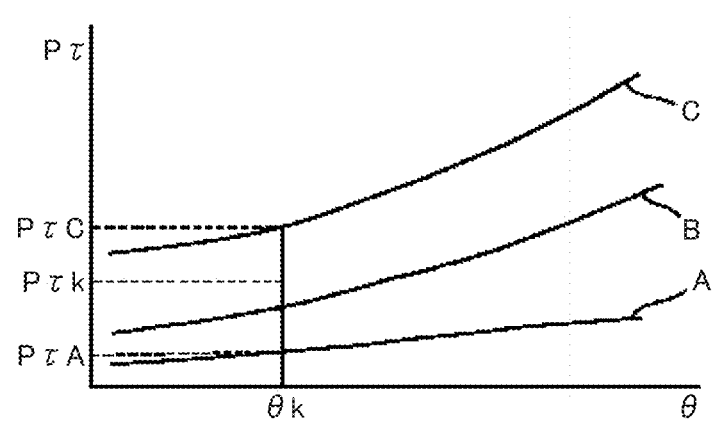
FIG. 4 shows the relation between a boom angle and a differential pressure for each instantaneous load.

FIG. 4 shows one example of the relation between a boom angle θ and a differential pressure Pτ for each instantaneous load. In FIG. 4, curves A, B and C represent a case in which bucket 6 is empty, a case in which bucket 6 is loaded half, and a case in which bucket 6 is fully loaded, respectively. Based on a graph of the relation between boom angle θ and differential pressure Pτ at two or more instantaneous loads measured in advance, a graph of the relation between the instantaneous load and differential pressure Pτ for each boom angle θ can be obtained as shown in FIG. 5. Therefore, when boom angle θ and differential pressure Pτ are obtained, an instantaneous load in each differential pressure sampling can be obtained.

Figure 5:
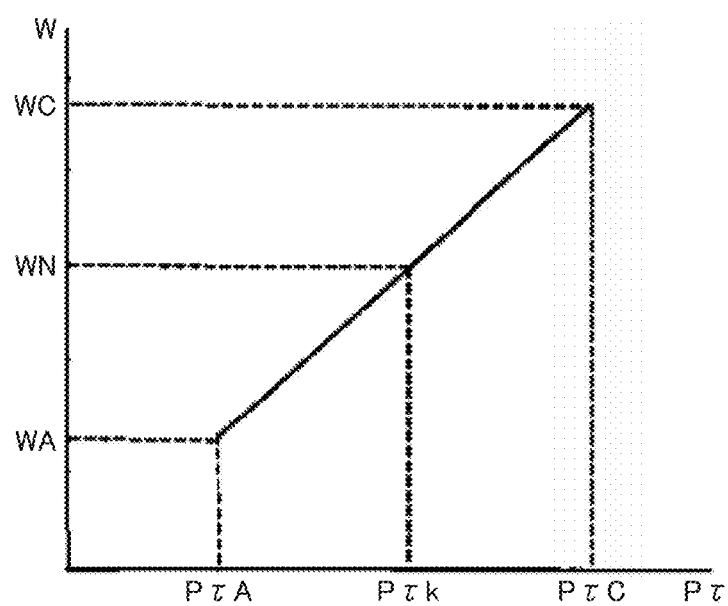
FIG. 5 shows the relation between a differential pressure and a load weight at a certain boom angle.

For example, assuming that boom angle θ=θk and differential pressure Pτ=Pτk at certain time mk as shown in FIG. 4, an instantaneous load WN can be obtained from FIG. 5. In other words, FIG. 5 is a graph showing the relation between the differential pressure and instantaneous load W at boom angle θ=θk. In this case, PτA refers to a differential pressure when bucket 6 is empty at boom angle θ=θk; WA refers to an instantaneous load in the unloaded state at boom angle θ=θk; PC refers to a differential pressure when bucket 6 is fully loaded at boom angle θ=θk; WC refers to an instantaneous load in the fully-loaded state at boom angle θ=θk. When Pτk is located between PτA and PτC, instantaneous load WN is determined by linear interpolation. Alternatively, instantaneous load WN can also be obtained based on a numerical table that stores the above-described relation in advance.

<Excavation and Loading Operation and Determination Thereof>

Figure 6:
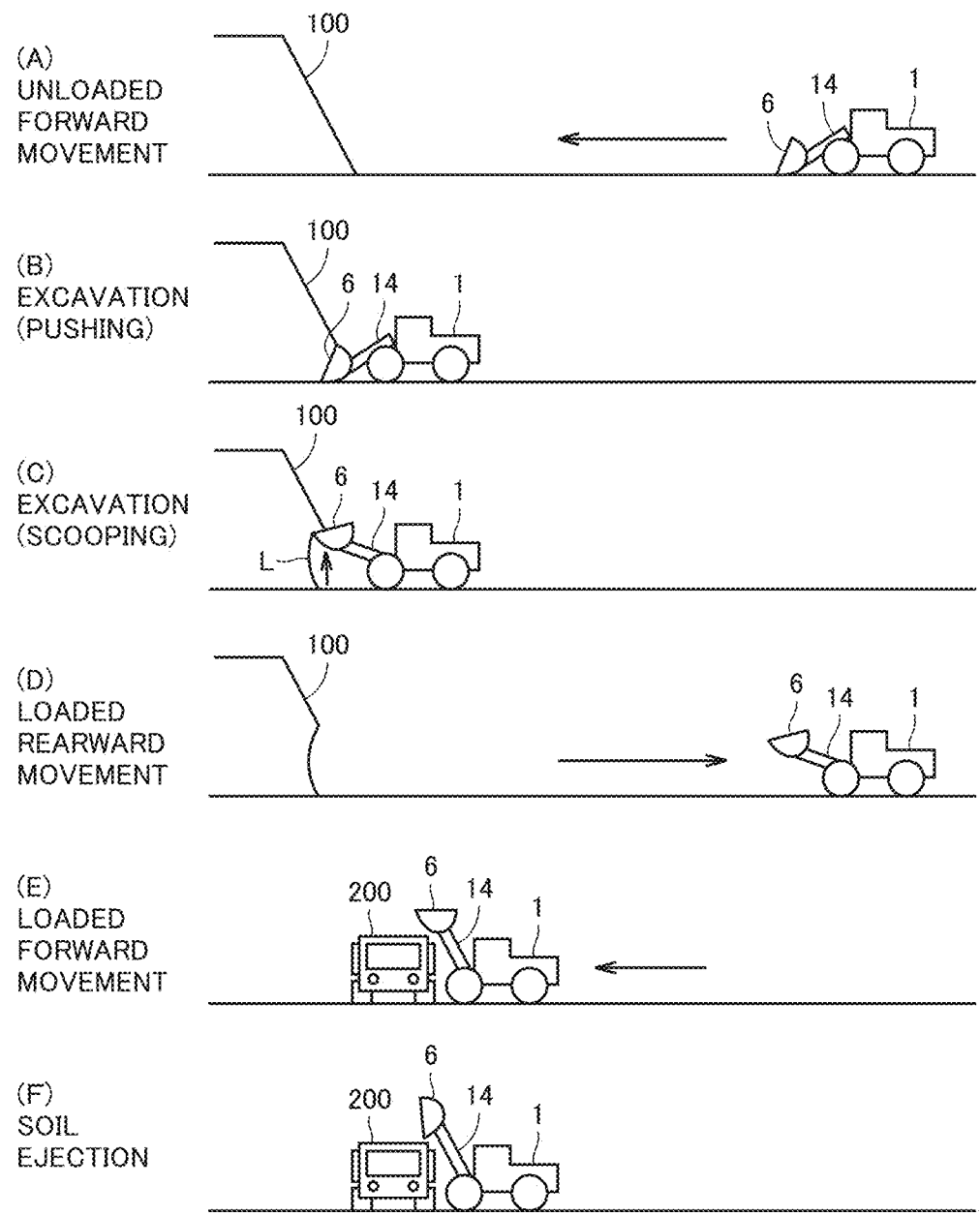
FIG. 6 is a schematic diagram showing a series of steps such as an excavation work and a loading work by the wheel loader.

Wheel loader 1 according to the present embodiment performs the excavation operation for scooping an excavated object such as soil onto bucket 6, and the loading operation for loading the load (an excavated object 100) in bucket 6 onto a transportation machine such as a truck bed (an object to be loaded with a load) of a dump truck 200. FIG. 6 is a schematic diagram showing an example of a series of steps that constitute the excavation operation and the loading operation of wheel loader 1 according to the embodiment. By repeating the sequential execution of a plurality of steps described below, wheel loader 1 excavates excavated object 100 and loads excavated object 100 onto the transportation machine such as dump truck 200.

As shown in FIG. 6(A), wheel loader 1 moves forward toward excavated object 100. In this unloaded forward movement step, the operator operates boom cylinder 16 and tilt cylinder 19 to cause work implement 3 to take an excavation attitude in which the tip of boom 14 is located at a low position and bucket 6 faces horizontally. In this state, the operator causes wheel loader 1 to move forward toward excavated object 100.

As shown in FIG. 6(B), the operator causes wheel loader 1 to move forward until cutting edge 6a of bucket 6 bites into excavated object 100. In this excavation (pushing) step, cutting edge 6a of bucket 6 bites into excavated object 100.

As shown in FIG. 6(C), the operator then operates boom cylinder 16 to raise bucket 6, and operates tilt cylinder 19 to tilt back bucket 6. As a result of this excavation (scooping) step, bucket 6 is raised along a bucket trace L as shown by a curved arrow in the figure, and excavated object 100 is scooped into bucket 6. Thus, the excavation work for scooping excavated object 100 is performed.

Depending on the type of excavated object 100, the scooping step may be completed simply by tilting back bucket 6 once. Alternatively, an operation for tilting back bucket 6 to bring bucket 6 into neutral, and then, tilting back bucket 6 again may be repeated in the scooping step.

As shown in FIG. 6(D), after excavated object 100 is scooped into bucket 6, the operator causes wheel loader 1 to move rearward in a loaded rearward movement step. The operator may perform boom-raising during rearward movement, or may perform boom-raising during forward movement in FIG. 6(E).

As shown in FIG. 6(E), the operator causes wheel loader 1 to move forward and come closer to dump truck 200 while maintaining bucket 6 in the raised state or while raising bucket 6. As a result of this loaded forward movement step, bucket 6 is located substantially directly above a truck bed of dump truck 200.

As shown in FIG. 6(F), the operator dumps bucket 6 at a prescribed position, and loads the load (excavated object) in bucket 6 onto the truck bed of dump truck 200. This step is a so-called soil ejection step. Thereafter, the operator lowers boom 14 while causing wheel loader 1 to move rearward, and returns bucket 6 to the excavation attitude.

The above are typical steps that constitute one cycle of the excavation and loading work.

FIG. 7 is a table showing a determination method in the series of steps that constitute the excavation work and the loading work of wheel loader 1.

In the table shown in FIG. 7, the uppermost line of "work step" shows the designation of the work step shown in each of FIGS. 6(A) to 6(F). The lines of "forward and rearward movement switching lever", "work implement operation" and "work implement cylinder pressure" below the uppermost line show various determination criteria used by first processor 30 (FIGS. 2 and 3) to determine which step among the work steps is currently performed.

More specifically, the line of "forward and rearward movement switching lever" shows a determination criterion about the forward and rearward movement switching lever, which is indicated by a circle mark.

The line of "work implement operation" shows a determination criterion about an operation performed on work implement 3 by the operator, which is indicated by a circle mark. More specifically, the line of "boom" shows a determination criterion about an operation performed on boom 14. Also, the line of "bucket" shows a determination criterion about an operation performed on bucket 6.

The line of "work implement cylinder pressure" shows a determination criterion about a current hydraulic pressure of a cylinder of work implement 3, e.g., hydraulic pressure of the cylinder bottom chamber of boom cylinder 16. Four reference values A, B, C, and P are set in advance for the hydraulic pressure. A plurality of pressure ranges (a range lower than a reference value P, a range of reference values A to C, a range of reference values B to P, and a range lower than reference value C) are defined based on these reference values A, B, C, and P. Also, these pressure ranges are set as the above-described determination criterion. The relation of magnitudes of four reference values A, B, C, and P is defined as A>B>C>P.

By using a combination of determination criteria for "forward and rearward movement switching lever", "boom", "bucket", and "work implement cylinder pressure" for each work step as described above, first processor 30 can determine which step among the work steps is currently performed.

A specific operation of first processor 30 when performing the control shown in FIG. 7 will be described below.

A combination of determination criteria for "forward and rearward movement switching lever", "boom", "bucket", and "work implement cylinder pressure" corresponding to the respective work steps shown in FIG. 7 is stored in advance in storage unit 30j (FIG. 2). First processor 30 recognizes the currently selected forward and rearward movement switching lever (F, N or R) based on a signal from forward and rearward movement switching apparatus 49. First processor 30 recognizes a type (lowering, neutral or raising) of a current operation performed on boom 14 based on a signal from boom operation detection unit 52b. First processor 30 recognizes a type (dumping, neutral or tilting back) of a current operation performed on bucket 6 based on a signal from bucket operation detection unit 54b. Furthermore, first processor 30 recognizes a current hydraulic pressure in the cylinder bottom chamber of boom cylinder 16 based on a signal from pressure sensor 28b shown in FIG. 2.

First processor 30 compares a combination of the current forward and rearward movement switching lever, the current boom operation type, the current bucket operation type, and the current lift cylinder hydraulic pressure that have been recognized (i.e., a current work state) with the pre-stored combination of determination criteria for "forward and rearward movement switching lever", "boom", "bucket", and "work implement cylinder pressure" corresponding to the respective work steps. As a result of this comparison process, first processor 30 determines a work step that corresponds to the combination of determination criteria best matching with the current work state.

Specifically, the combination of determination criteria corresponding to the excavation and loading operation shown in FIG. 6 is as follows.

In the unloaded forward movement step, the forward and rearward movement switching lever is F, the boom operation and the bucket operation are both neutral, and the work implement cylinder pressure is lower than reference value P.

In the excavation (pushing) step, the forward and rearward movement switching lever is F, the boom operation and the bucket operation are both neutral, and the work implement cylinder pressure is in the range of reference values A to C. In place of the forward and rearward movement switching lever, the operation of a work tool (a bucket, a boom) may be used as a parameter.

In the excavation (scooping) step, the forward and rearward movement switching lever is F or R, the boom operation is raising or neutral, the bucket operation is tilting back, and the work implement cylinder pressure is in the range of reference values A to C. As to the bucket operation, a determination criterion that tilting back and neutral are alternately repeated may be further added. This is because, depending on the state of the excavated object, the operation of tilting back bucket 6 to bring bucket 6 into neutral, and then, tilting back bucket 6 again may be repeated.

In the loaded rearward movement step, the forward and rearward movement switching lever is R, the boom operation is neutral or raising, the bucket operation is neutral, and the work implement cylinder pressure is in the range of reference values B to P. Determination may be made not only based on the forward and rearward movement switching lever but also based on the actual vehicle speed.

In the loaded forward movement step, the forward and rearward movement switching lever is F, the boom operation is raising or neutral, the bucket operation is neutral, and the work implement cylinder pressure is in the range of reference values B to P.

In the soil ejection step, the forward and rearward movement switching lever is F, the boom operation is raising or neutral, the bucket operation is dumping, and the work implement cylinder pressure is in the range of reference values B to P.

In the rearward movement and boom lowering step, the forward and rearward movement switching lever is R, the boom operation is lowering, the bucket operation is tilting back, and the work implement cylinder pressure is lower than reference value P.

<Measurement Flow of Load Weight>

In the above-described excavation and loading operation, wheel loader 1 in the present embodiment measures the load weight in bucket 6 and calculates the summation value of the load weights.

Figure 8:
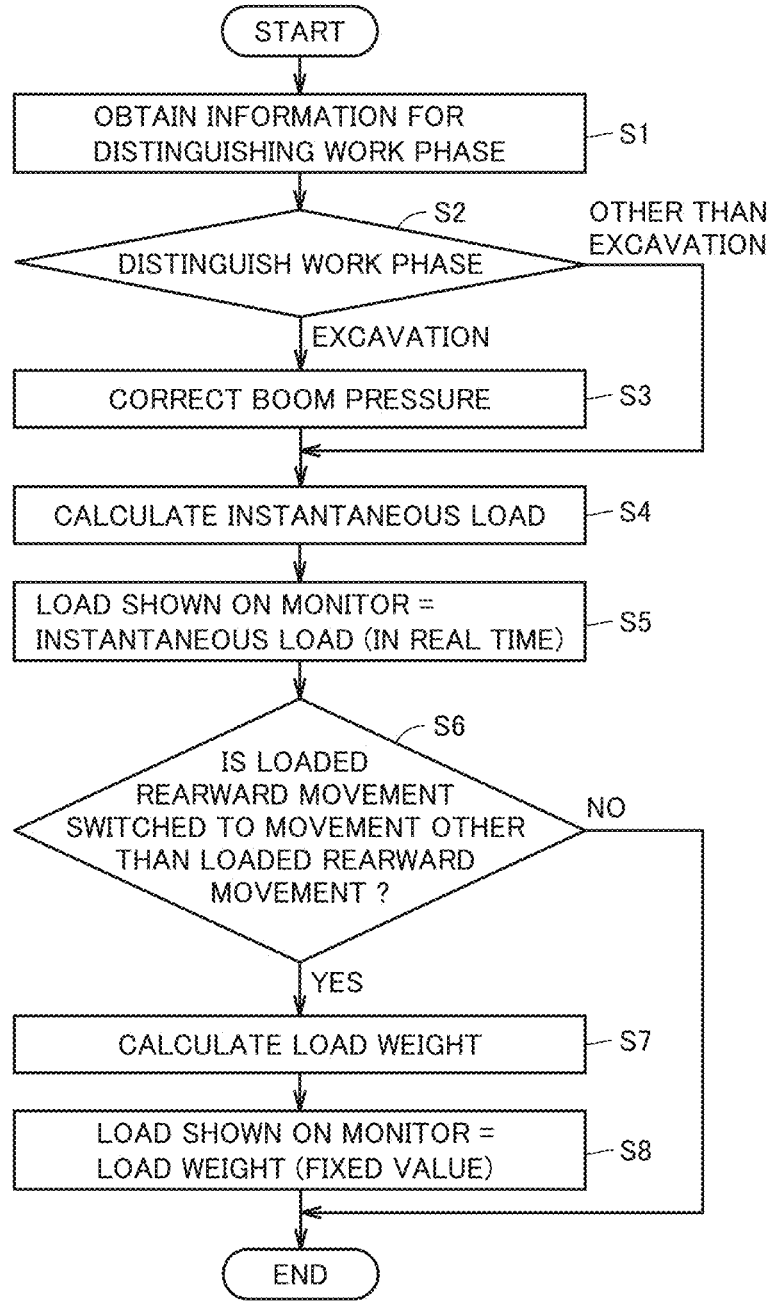
FIG. 8 is a first flowchart illustrating a method of controlling the work machine according to the embodiment.

FIG. 8 is the first flowchart illustrating a method of controlling the work machine, which includes a method of measuring the load weight in the above-mentioned excavation and loading operation.

As shown in FIGS. 6 and 7, wheel loader 1 performs a series of operations in the excavation and loading operation. In order to recognize the current work phase in the series of excavation and loading operations, the information about the work phase is obtained (step S1: FIG. 8).

For example, as shown in FIG. 3, the information about this work phase is a detection signal of the forward and rearward movement command output from forward and rearward movement switching apparatus 49, a detection signal of the operation command for boom 14 output from boom operation apparatus 52, a detection signal of the operation command for bucket 6 output from bucket operation apparatus 54, a pressure detection signal for boom cylinder 16, and the like. The information about the work phases as described above is input into work phase distinction unit 30a.

Based on the obtained information about the work phase, work phase distinction unit 30a distinguishes the work phase while referring to the table shown in FIG. 7 (step S2: FIG. 8). As a result of this distinction of the work phase, when the work phase is determined as excavation, the boom pressure (that is, the differential pressure between the head pressure detected by pressure sensor 28a and the bottom pressure detected by pressure sensor 28b, more specifically, the output value obtained after the smoothing process) is corrected (step S3: FIG. 8).

As correction of the boom pressure, one of the first correction and the second correction as described below is performed, for example.

Figure 10:
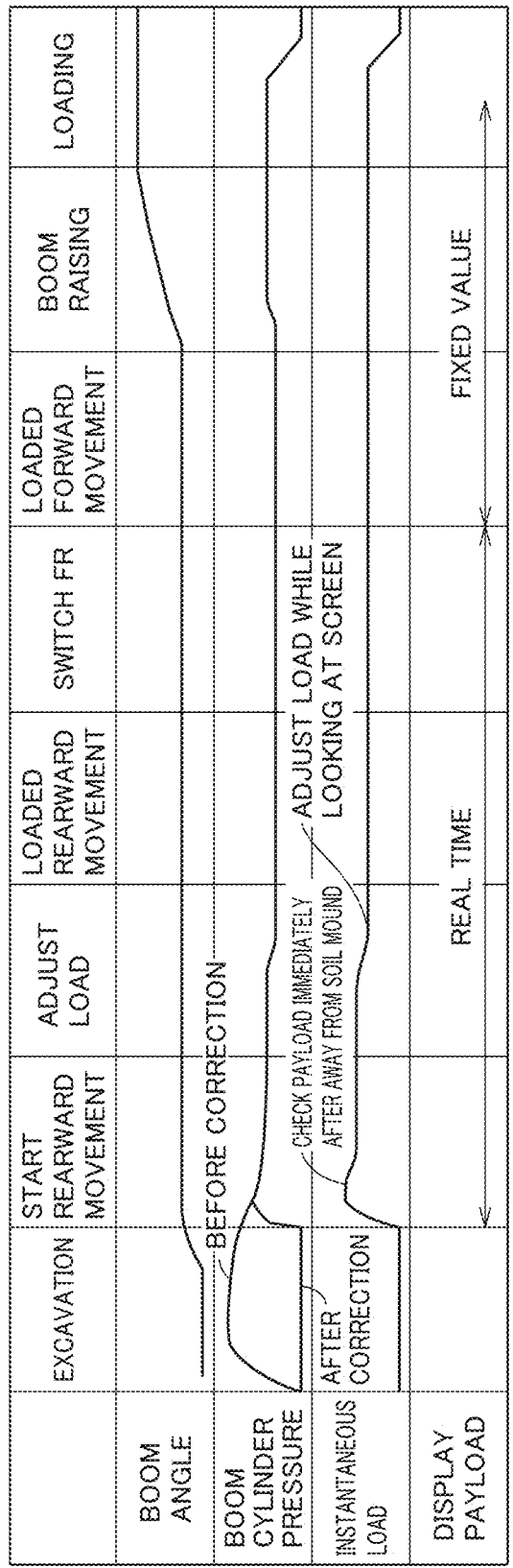
FIG. 10 is a diagram showing a first example of changes in a boom angle, a boom cylinder differential pressure, an instantaneous load and a load weight in the series of steps such as an excavation work and a loading work of the wheel loader.

In the first correction, as shown in FIG. 10, when the work phase is distinguished as excavation, the boom pressure is corrected so as to be set at a reference value. In this case, the reference value includes an invalid value and a prescribed value. The reference value is an invalid value of "0", for example. It should be noted that the reference values may be a prescribed value other than "0". The reference value may be reflected in the displayed value. Specifically, the controller (first processor 30, second processor 70) may control display units 40 and 75 such that the above-mentioned reference value is shown on display units 40 and 75 before distinction of excavation in the work phase switches.

In the first correction, in a time period from the time when the work phase switches from excavation to loaded rearward movement to a prescribed timing in the middle of the loaded rearward movement, the boom pressure is subjected to the above-mentioned smoothing process to thereby correct the boom pressure so as to gradually rise from the above-mentioned reference value and reach the measurement value.

Also in the first correction, after the boom pressure becomes equal to the measurement value, the boom pressure is kept at the measurement value that is not corrected until loading ends. The measurement value may be reflected in the displayed value. Specifically, the controller (first processor 30, second processor 70) may control display units 40 and 75 to show the above-mentioned measurement value (the load calculated based on the cylinder pressure) after distinction of excavation in the work phase switches.

Figure 11:
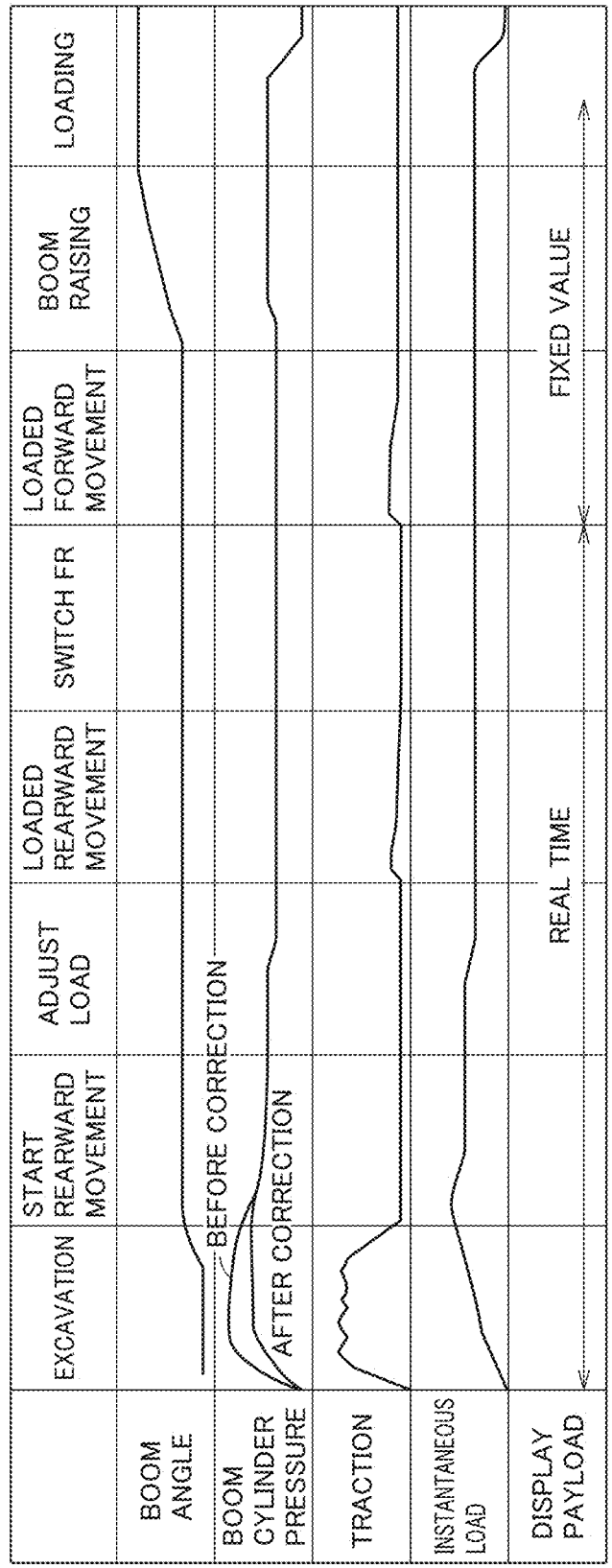
FIG. 11 is a diagram showing a second example of changes in the boom angle, the boom cylinder differential pressure, the instantaneous load and the load weight in the series of steps such as an excavation work and a loading work of the wheel loader.

Then, in the second correction, as shown in FIG. 11, the boom pressure is corrected such that the traction pressure calculated based on traction is subtracted from the boom pressure.

Also in the second correction, the traction pressure is subtracted from the boom pressure while the traction is detected. Thus, when traction is detected even after the work phase switches from excavation to loaded rearward movement, the traction pressure may be subtracted from the boom pressure.

Also in the second correction, from the time point when the traction is no longer sensed to the time point when loading ends, the boom pressure is kept at the measurement value that is not corrected.

The traction mentioned above is calculated as follows.

For a direct transmission vehicle in which a torque converter is not provided between an engine and a transmission, traction is calculated by the following equation (1).

$$\text{Traction [N]} = \{(\text{engine output shaft torque [N·m]} - \text{pump load torque [N·m]}) \times \text{transmission reduction ratio} \times \text{differential reduction ratio} \times \text{final reduction ratio} \times \text{torque efficiency}\} / \text{tire effective diameter [m]} \quad (1)$$

Furthermore, for a vehicle including a torque converter provided between an engine and a transmission, traction is calculated by the following equation (2).

$$\text{Traction [N]} = \{(\text{engine rotation speed [rpm]}/1000)^2 \times tp[\text{N·m/rpm}^2] \times t \times \text{transmission reduction ratio} \times \text{differential reduction ratio} \times \text{final reduction ratio} \times \text{torque efficiency}\} / \text{tire effective diameter [m]} \quad (2)$$

Also, for a hydro-static transmission (HST) vehicle including a plurality of travel motors, traction is calculated by the following equation (3).

$$\text{Traction [kN]} = \beta \times F\_max \times R0/R \quad (3)$$

In this case, P in the above-mentioned equation (3) is represented by the following equation (4).

$$\beta = \{P \times (Rm1 \times q1 + Rm2 \times q2)\} / \{Pco \times (Rm1 \times q1\_max + Rm2 \times q2\_max)\} \quad (4)$$

Units are shown in parentheses [ ] in the equations (1) to (3). In this case, tp in the equation (2) shows a primal torque coefficient, and t shows a torque ratio. Primal torque coefficient tp and torque ratio t each are a characteristic value of the transmission.

In the equation (3), F_max shows a maximum traction (unit: kN), R0 shows a default load radius (unit: m), and R shows a tire load radius (unit: m).

Also in the equation (4), P is HST drive differential pressure (unit: MPa), Rm1 is a reduction ratio of the first motor, q1 is a volume of the first motor (unit: cc/rev), Rm2 is a reduction ratio of the second motor, and q2 is a volume of the second motor (unit: cc/rev).

Also in the equation (4), Pco is HST cutoff differential pressure (unit: MPa), q1_max is a maximum volume of the first motor (unit: cc/rev), and q2_max is a maximum volume of the second motor (unit: cc/rev).

The engine output shaft torque in the equation (1) is obtained by the combination of the quantity of injection from engine 20 shown in FIG. 2 and the engine rotation speed. The quantity of injection from engine 20 is calculated based on the amount of operation in accelerator operation member 51a that is detected by accelerator operation detection unit 51b. The engine rotation speed is obtained by rotation sensor 32 sensing the rotation speed of the rotation shaft inside engine 20 shown in FIG. 2. Based on the engine rotation speed and the quantity of injection as obtained in this way, the engine output shaft torque is obtained by referring to the table about the combination of the engine rotation speed in engine 20 and the quantity of injection from engine 20.

The pump load torque in the equation (1) is calculated from the pump volume and the discharge pressure of work implement pump 25 shown in FIG. 2. The pump volume of work implement pump 25 is calculated by detecting the angle of the swash plate of work implement pump 25 by sensor 33 shown in FIG. 2. The discharge pressure of work implement pump 25 is detected by pressure sensor 34 shown in FIG. 2.

The engine rotation speed in the equation (2) is obtained by rotation sensor 32 sensing the rotation speed of the rotation shaft inside engine 20 shown in FIG. 2.

Each of the transmission reduction ratio, the differential reduction ratio, the final reduction ratio, the torque efficiency, tp, and t in the equations (1) and (2) is a constant.

The signal of the corrected pressure calculated by the above-mentioned first correction or second correction is output from boom pressure correction unit 30b to load weight calculation unit 30c as shown in FIG. 3. Load weight calculation unit 30c calculates the instantaneous load as a load weight in bucket 6 based on the boom angle signal output from boom angle sensing unit 30h and the signal of the above-mentioned corrected pressure calculated by boom pressure correction unit 30b (step S4: FIG. 8). The instantaneous load is calculated as described above with reference to FIGS. 4 and 5.

When work phase distinction unit 30a distinguishes the work phase as a work phase other than excavation (step S2: FIG. 8), boom pressure correction unit 30b outputs, to load weight calculation unit 30c, the signal of the differential pressure (the signal of the boom pressure) between the head pressure and the bottom pressure of boom cylinder 16 that is output from differential pressure sensing unit 30i without correcting this signal, as shown in FIG. 3. Load weight calculation unit 30c calculates the instantaneous load in bucket 6 based on the signal of the boom pressure and the boom angle signal output from boom angle sensing unit 30h (step S4: FIG. 8).

As described above, in both of the first correction and the second correction, correction of the boom pressure is switched when it is distinguished that the work phase is switched from excavation to another phase (for example, loaded rearward movement). In both of the first correction and the second correction, when it is distinguished that the work phase is switched from excavation, for example, to the loaded rearward movement, boom pressure correction unit 30b outputs the signal of the boom pressure to load weight calculation unit 30c without correcting this signal.

In the case of the second correction, while traction is sensed by traction sensing units 32 to 34 and 51b, and the traction pressure calculated based on this traction is output to boom pressure correction unit 30b, even in the case of loaded rearward movement, boom pressure correction unit 30b may correct the boom pressure and output the corrected pressure to load weight calculation unit 30c.

As shown in FIG. 3, the instantaneous load calculated by load weight calculation unit 30c is output from load weight calculation unit 30c to load weight output unit 30e. Load weight output unit 30e outputs the instantaneous load to display unit 40. Thereby, the instantaneous load is shown on display unit 40 in real time (step S5: FIG. 8).

After wheel loader 1 travels rearward by a prescribed distance in the loaded rearward movement, an operator performs the operation of switching from loaded rearward movement to loaded forward movement. Work phase distinction unit 30a shown in FIG. 3 distinguishes whether or not the work phase is switched from loaded rearward movement to loaded forward movement (step S6: FIG. 8).

Switching from loaded rearward movement to loaded forward movement is sensed, for example, based on whether or not the operator has moved forward and rearward movement switching operation member 49a of forward and rearward movement switching apparatus 49 shown in FIG. 2 from the rearward movement (R) position to the forward movement (F) position. When the loaded rearward movement is switched to the loaded forward movement, forward and rearward movement switching apparatus 49 (forward and rearward movement switching detection sensor 49b) shown in FIG. 3 outputs a signal showing forward movement (forward and rearward movement switching signal) to work phase distinction unit 30a. Thus, based on this forward movement signal, work phase distinction unit 30a can sense that the traveling state has been switched from the loaded rearward movement to the loaded forward movement.

Also, switching from loaded rearward movement to loaded forward movement may be sensed, for example, by sensing the movement speed of wheel loader 1 that is sensed by vehicle speed detection unit 27 shown in FIG. 2. When the loaded rearward movement is switched to the loaded forward movement, the movement speed of wheel loader 1 sensed by vehicle speed detection unit 27 changes from the speed of movement in the rearward direction to the speed of movement in the forward direction. Thus, based on the signal of the movement speed of wheel loader 1 indicating forward movement (forward and rearward movement switching signal) that is output from vehicle speed detection unit 27, work phase distinction unit 30a shown in FIG. 3 can sense that the loaded rearward movement has been switched to the loaded forward movement.

Furthermore, the traveling state of wheel loader 1 may be captured by an image pick-up apparatus. Then, based on the captured image, switching from the loaded rearward movement to the loaded forward movement may be sensed.

When work phase distinction unit 30a distinguishes that the work phase has been switched from loaded rearward movement to loaded forward movement, the instantaneous load at the time point of switching from loaded rearward movement to loaded forward movement is calculated as a load weight (step S7: FIG. 8).

In this case, in the same manner as described above, boom pressure correction unit 30b outputs, to load weight calculation unit 30c, the signal of the differential pressure (the signal of the boom pressure) between the head pressure and the bottom pressure of boom cylinder 16 that is output from differential pressure sensing unit 30i without correcting this signal, as shown in FIG. 3. Load weight calculation unit 30c calculates the instantaneous load in bucket 6 as a load weight based on the above-mentioned signal of the boom pressure and the boom angle signal output from boom angle sensing unit 30h.

The load weight calculated by load weight calculation unit 30c is output from load weight calculation unit 30c to load weight output unit 30e. Load weight output unit 30e outputs the load weight to display unit 40. Thereby, display unit 40 shows the load weight as a fixed value (step S8: FIG. 8). This load weight is kept shown on display unit 40 as a fixed value from the time point when switching from loaded rearward movement to loaded forward movement is sensed to the time point when the work phase is distinguished as loading.

Furthermore, load weight output unit 30e outputs the load weight to storage unit 30j. Storage unit 30j stores the load weight output from load weight output unit 30e.

The above-described excavation and loading operation is repeatedly performed. The load weights are summed based on the load weight that is output for each excavation and loading operation.

As shown in FIG. 3, the load weights are summed by load weight summation unit 30f. Load weight summation unit 30f automatically adds the current load weight to the summation value of previous load weights stored in storage unit 30j (i.e., automatically sums a plurality of load weights). The summation value obtained by summation is output from load weight summation unit 30f and input into summation value output unit 30g. The summation value obtained by summation is stored in storage unit 30j by summation value output unit 30g and shown on display unit 40 and shown on display unit 75 of second processor 70.

During the above-mentioned excavation and loading operation that is repeatedly performed, the operator can check the instantaneous load shown on display unit 40 in real time in step S5 in FIG. 8. Specifically, the operator can check the instantaneous load on display unit 40 immediately after the end of excavation in the above-mentioned excavation and loading operation (immediately after the loaded rearward movement is started). When the instantaneous load is loaded onto an object to be loaded with a load (this object is, for example, a truck bed of a dump truck), the operator determines whether or not the summation value of the load weights exceeds the loadable capacity in the object to be loaded with a load. When the operator determines that the summation value of the load weights exceeds the loadable capacity in the object to be loaded with a load, the operator unloads a part of the load contained in bucket 6 at or near the excavation site. Thereby, the instantaneous load is adjusted such that the summation value of the load weights does not exceed the loadable capacity in the object to be loaded with a load.

After adjusting the instantaneous load as described above, the operator operates wheel loader 1 so as to travel rearward from the excavation site (loaded rearward movement). Then, after wheel loader 1 travels rearward by a predetermined distance, the movement of wheel loader 1 is switched to loaded forward movement. Then, at the position where wheel loader 1 approaches the object to be loaded with a load, the operator operates bucket 6 to perform a dumping operation so as to load the load (excavated object) in bucket 6 onto the truck bed of dump truck 200. Thereby, the above-mentioned excavation and loading operation can be completed without exceeding the loading capacity of the dump truck.

As described above, the control of the work machine including measurement and summation of the load weights in the excavation and loading operation in the present embodiment is performed.

Figure 9:
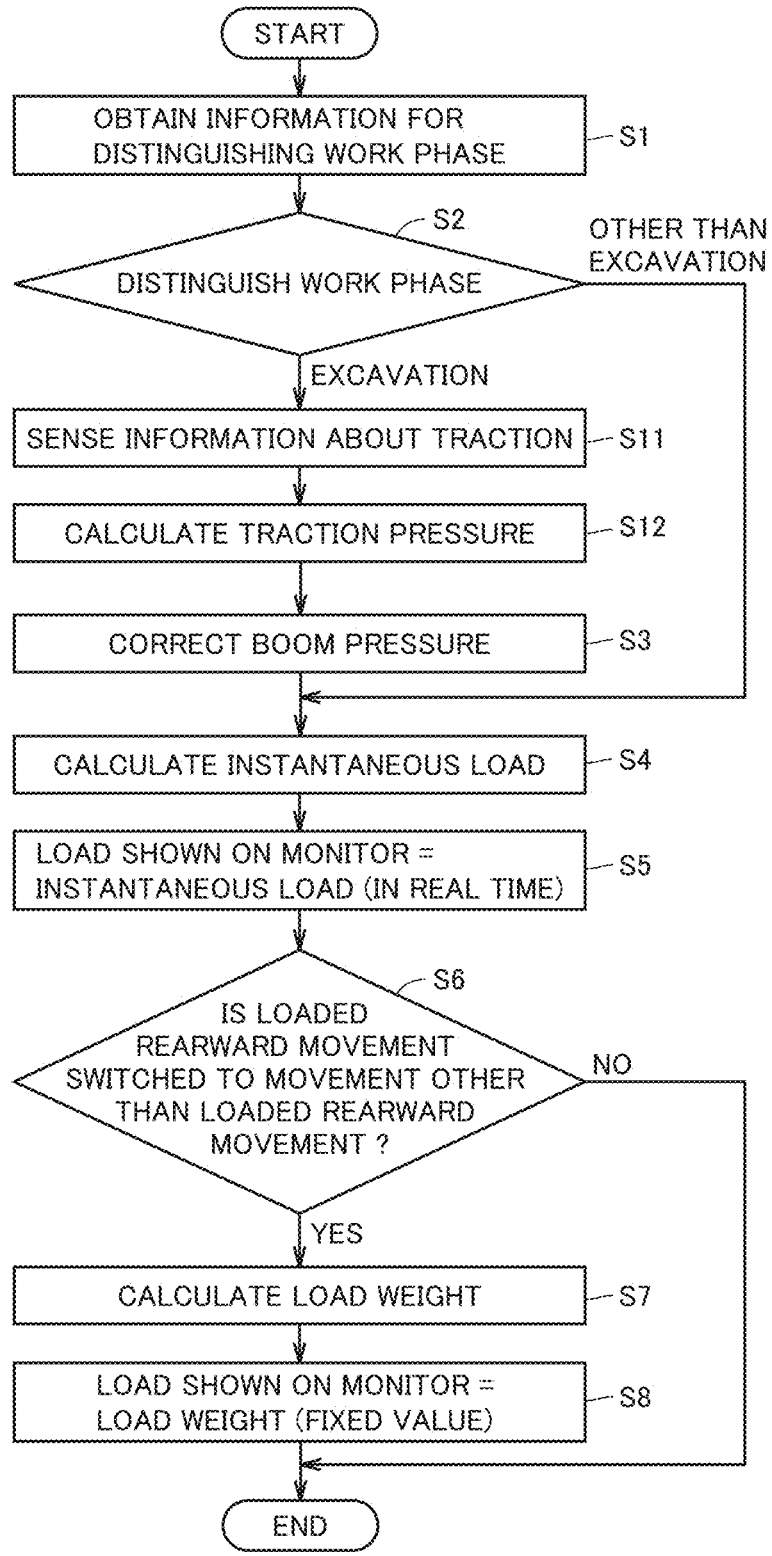
FIG. 9 is a second flowchart illustrating the method of controlling the work machine according to the embodiment.

FIG. 9 is the second flowchart illustrating the method of controlling the work machine, which includes a method of measuring the load weight in the excavation and loading operation as described above. The second flow shown in FIG. 9 relates to the correction of subtracting the above-mentioned traction pressure from the boom pressure.

As shown in FIG. 9, in the second flow, wheel loader 1 performs a series of operations in the excavation and loading operation as in the first flow shown in FIG. 8. In order to recognize the current work phase in the series of excavation and loading operations, the information about the work phase is obtained (step S1).

For example, as shown in FIG. 3, the information about this work phase is a detection signal of the forward and rearward movement command output from forward and rearward movement switching apparatus 49, a detection signal of the operation command for boom 14 output from boom operation apparatus 52, a detection signal of the operation command for bucket 6 output from bucket operation apparatus 54, a pressure detection signal for boom cylinder 16, and the like. The information about the work phases as described above is input into work phase distinction unit 30a.

Based on the obtained information about the work phase, work phase distinction unit 30a distinguishes the work phase while referring to the table shown in FIG. 7 (step S2). When the work phase is determined as excavation as a result of this distinction of the work phase, the information about the traction is sensed (step S11). For example, as shown in FIG. 2, the information about traction includes a rotation speed of the rotation shaft inside engine 20 detected by rotation sensor 32, an angle of the swash plate of work implement pump 25 detected by sensor 33, discharge pressure of work implement pump 25 detected by pressure sensor 34, an amount of operation in accelerator operation member 51a detected by accelerator operation detection unit 51b, and the like.

Based on this information about the traction, traction is calculated using the above-mentioned equation (1), (2), or (3). Then, based on this traction, traction pressure is calculated (step S12). Then, based on the calculated traction pressure, the boom pressure is corrected (step S3).

Since the subsequent steps are the same as those in the above-described first flow, the description thereof will not be repeated.

In this second flow, the boom pressure is corrected during the time period in which traction is sensed, thereby eliminating the need to perform the step of distinguishing the work phase.

<Display Content on Display Unit 40>

FIGS. 12(A) to 12(D) each show a change in a display content on display unit 40. As shown in FIG. 12(A), when the work phase is distinguished as unloaded forward movement and excavation, display unit 40 shows a target load weight in bucket 6. For example, on a display meter portion having an arc shape labelled as "current" on display unit 40, a target load weight % represented as a bar extending to the "100%" position along the arc shape is supplementarily shown.

As shown in FIG. 12(B), when the work phase is distinguished as loaded rearward movement, display unit 40 shows the current instantaneous load in bucket 6. For example, on the display meter portion having an arc shape labelled as "current" on display unit 40, the current instantaneous load % represented as a bar extending along the arc shape is shown in real time.

The operator checks display unit 40. Then, when the current instantaneous load during loaded rearward movement exceeds the target load weight % (for example, 100%), the operator performs the operation of unloading a part of the load from bucket 6. Thereby, the load in bucket 6 can be adjusted. The instantaneous load at this time is represented by the first color, for example.

As shown in FIG. 12(C), display unit 40 shows, as a load weight of a fixed value, the instantaneous load calculated when it is sensed that the work phase is switched from loaded rearward movement to loaded forward movement. This load weight as a fixed value is continuously shown on display unit 40 from the time point when switching from loaded rearward movement to loaded forward movement is sensed to the time point when loading is sensed.

For example, on the display meter portion having an arc shape labelled as "current" on display unit 40, the load weight % represented as a bar extending along this arc shape is shown as a fixed value. At the time point when loaded rearward movement is switched to loaded forward movement, the measurement value of the load in bucket 6 is stable. Thus, less erroneous measurement values can be displayed.

This load weight as a fixed value is shown by the second color different from the first color that shows the instantaneous load. Thereby, the operator can readily visually recognize that the load weight as a fixed value is displayed.

As shown in FIG. 12(D), display unit 40 shows: a summation value of the load weights loaded onto the object to be loaded with a load; and a difference obtained by subtracting the summation value of the load weights from the loadable capacity in the object to be loaded with a load. For example, on the display meter portion having an arc shape labelled as "remainder" on display unit 40, the summation value of the load weights loaded onto the object to be loaded with a load is shown as a bar extending along the arc shape. Also, below the indication of "remainder", the difference obtained by subtracting the summation value of the load weights from the loadable capacity in the object to be loaded with a load is shown as a numerical value.

<Changes in Boom Angle, Boom Bottom Pressure, Instantaneous Load, and Load Weight>

The present inventor checked changes in boom angle, boom cylinder differential pressure, instantaneous load, and load weight in the series of steps of the excavation and loading operation of wheel loader 1 according to the present embodiment. The result is shown in FIG. 13.

Figure 13:
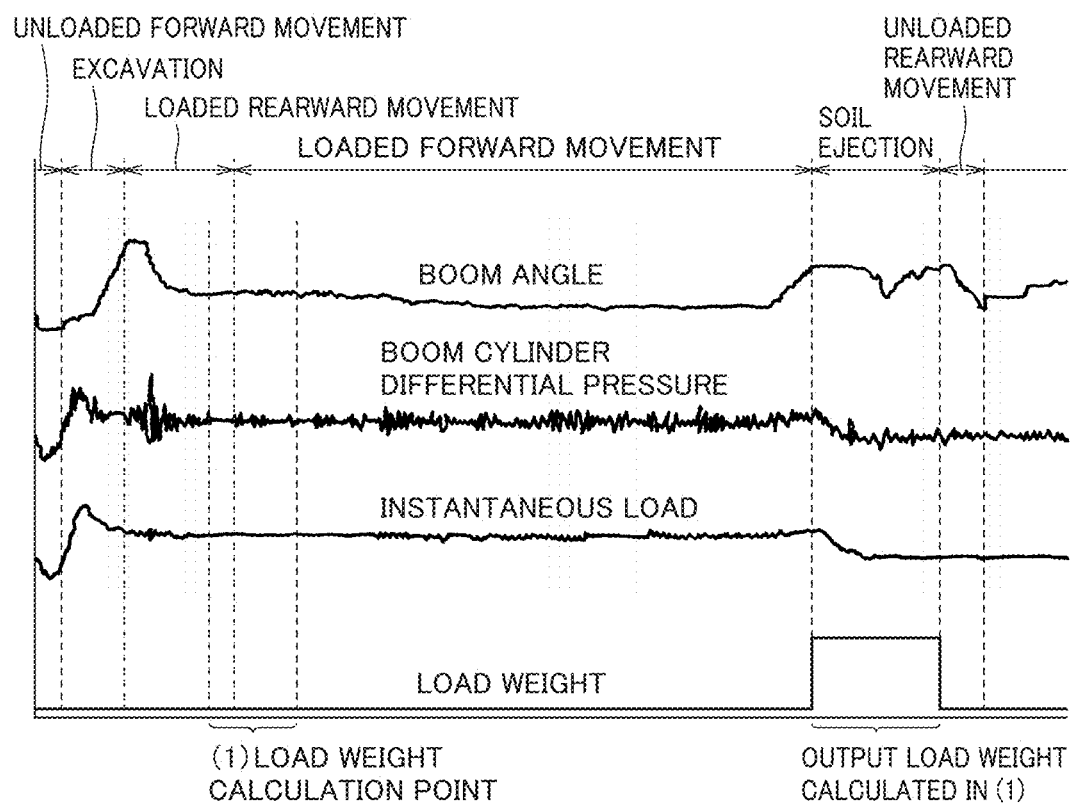
FIG. 13 is a diagram showing an example of changes in the boom angle, the boom cylinder differential pressure, the instantaneous load and the load weight in the series of steps such as an excavation work and a loading work of the wheel loader.

The result in FIG. 13 shows that each of the boom angle, the boom cylinder differential pressure and the instantaneous load changes significantly during excavation and during soil ejection. It also shows that each of the boom angle, the boom cylinder differential pressure and the instantaneous load changes significantly also in the first half of loaded rearward movement. In contrast, in the latter half of loaded rearward movement and during loaded forward movement, changes over time in boom angle, boom cylinder differential pressure and instantaneous load are small. In particular, immediately before switching from loaded rearward movement to loaded forward movement, changes over time in boom cylinder differential pressure and instantaneous load are very small, which shows that each of the boom cylinder differential pressure and the instantaneous load is stable.

<Effect in the Embodiment>

In the present embodiment, the boom cylinder differential pressure (boom pressure) significantly changes over time during excavation, as shown in FIG. 13. Thus, in the present embodiment, when the work phase is distinguished as excavation, the boom pressure is corrected. Then, based on this corrected pressure, the instantaneous load in bucket 6 is calculated. Thereby, it can be recognized whether or not the instantaneous load in bucket 6 exceeds the loading capacity of the object to be loaded with a load (for example, a truck bed of a dump truck) during excavation or immediately after the end of excavation. This can consequently shorten the time period required for going back to the excavation site in order to unload a part of the load in bucket 6, so that an increase in work time can be suppressed.

Furthermore, since the time period required for going back to the excavation site can be shortened as described above, a load does not have to be loaded onto the object to be loaded with a load, while leaving a part of the load in bucket 6. Therefore, the loading operation is facilitated.

Furthermore, the boom raising operation does not have to be performed for measuring the load weight as in the above-mentioned patent literature. This eliminates the need to lower the boom, so that the operator's operation becomes simplified.

As described above, the present embodiment can implement a work machine and a system including the work machine, by which the load weight can be measured in a short work time period by a simple operation.

Also in the present embodiment, wheel loader 1 includes traveling unit 4 as shown in FIG. 2. Thus, based on switching between rearward movement and forward movement of traveling unit 4, it can be distinguished whether the work phase is excavation or not.

Also in the present embodiment, as shown in FIG. 10, when the work phase is excavation, the boom pressure is corrected so as to be set at a reference value (for example, "0"). Then, the instantaneous load is calculated based on this corrected pressure. When the work phase is loaded rearward movement, the instantaneous load is calculated based on the measurement value of the boom pressure. This prevents the operator from determining whether to dump the load in bucket 6 or not based on the load measured during excavation with unstable boom pressure.

Also in the present embodiment, as shown in FIG. 10, the boom pressure is corrected to be set at a reference value for the entire time period during which the work phase is distinguished as excavation. This prevents the operator from determining whether to dump the load in bucket 6 or not for the entire time period of excavation with unstable boom pressure.

Also in the present embodiment, the boom pressure is corrected by subtracting the traction pressure from the boom pressure as shown in FIG. 11. The traction resulting from traveling of traveling unit 4 acts on the pressure of boom cylinder 16 during excavation. This traction is a cause of unstabilized boom pressure during excavation. Thus, by correcting the boom pressure so as to subtract the traction, the instantaneous load can be more accurately calculated.

Also in the present embodiment, as shown in FIG. 2, a notification unit (display units 40 and 75) is provided for giving a notification of the instantaneous load calculated by the controller (first processor 30, second processor 70). Thereby, the operator and the like can check the instantaneous load given from the notification unit for performing, for example, the operation of unloading the load in bucket 6.

It should be noted that the notification unit is not limited to display units 40 and 75, but may be a speaker that gives a notification with a sound.

Also in the present embodiment, as shown in FIGS. 10 and 11, when it is distinguished that loaded rearward movement has been started as a work phase, the controller (first processor 30, second processor 70) causes display units 40 and 75 to show the calculated instantaneous load as a current load value in real time. Thereby, when the load in bucket 6 is unloaded, the operator and the like can immediately check the instantaneous load in bucket 6 from which the load has been unloaded. Thus, the load value in bucket 6 is readily adjusted.

Also in the present embodiment, as shown in FIGS. 10 and 11, the controller (first processor 30, second processor 70) causes display units 40 and 75 to show the instantaneous load, which is calculated at a time point of switching from loaded rearward movement to loaded forward movement, as a load weight continuously from the time point when this switching is sensed to the time point when loading is distinguished. Thereby, the operator and the like can readily check the load weight.

Figure 12:
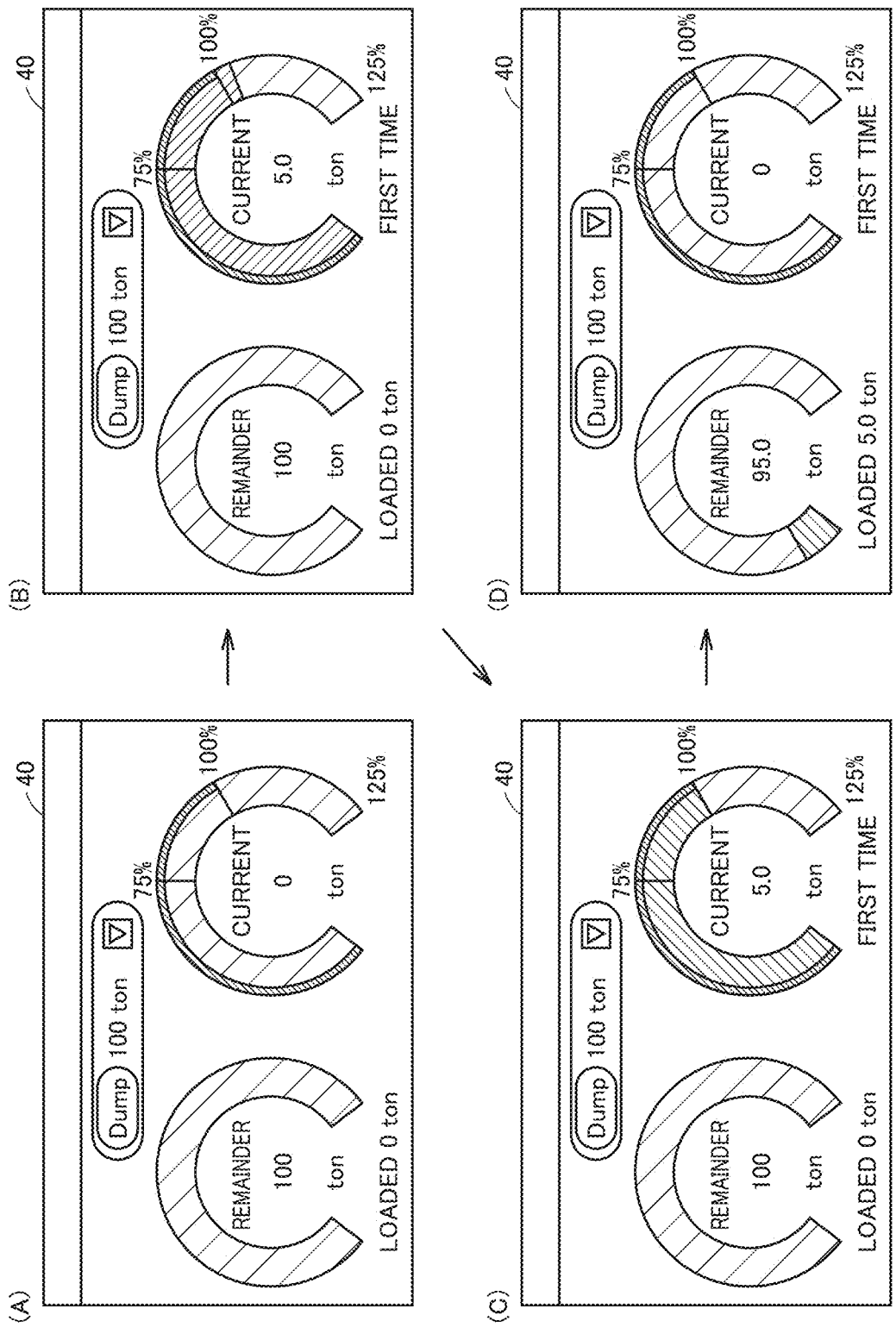
FIGS. 12(A) to 12(D) each show a change in a display content on a display unit.

Also in the present embodiment, as shown in FIGS. 12(A) to 12(D), display units 40 and 75 show the target load weight (FIG. 12(A)), the instantaneous load (FIG. 12 (B)), the load weight (FIG. 12 (C)), and the summation value of the load weights, and the difference obtained by subtracting the summation value of the load weights from the loadable capacity (FIG. 12 (D)). Thereby, the operator can unload the load in bucket 6 immediately after excavation based on the information on display unit 40 and the like, and also, can readily visually check the above-mentioned load weight, the above-mentioned summation value, and the above-mentioned difference.

A sensor used as the forward and rearward movement switching sensor may be those for vehicle speed detection by a GPS (Global Positioning System), vehicle speed detection using a stereo camera, vehicle speed detection using a rotation sensor of a transmission output shaft, vehicle speed detection using a rotation sensor of a transmission input shaft and a transmission gear ratio, and the like. The forward and rearward movement switching sensor is not limited to the above, but may be any sensor that can detect the traveling direction of the vehicular body.

Also, the above embodiment has been described with regard to the case where the load weight is calculated based on the boom angle and the differential pressure between the head pressure and the bottom pressure of boom cylinder 16, but the load weight may be calculated based on the bottom pressure and the boom angle of boom cylinder 16. In this case, pressure sensor 28a in FIG. 2 is not required.

Also, the above embodiment has been described with regard to the case where controllers 30 and 70 switch correction of the boom pressure when distinction of excavation in the work phase switches, as shown in FIGS. 8 and 9. However, controllers 30 and 70 may switch correction of the cylinder pressure of the work tool cylinder (boom cylinder 16 and tilt cylinder 19) that drives at least one of bucket 6 and boom 14 when distinction of the excavation in the work phase is switched.

Also, the above embodiment has been described with regard to the case where controllers 30 and 70 correct the boom pressure to calculate the corrected pressure of bucket cylinder 16 and calculate the instantaneous load in bucket 6 based on the corrected pressure, as shown in FIGS. 8 and 9. The present disclosure is not limited to the above, but controllers 30 and 70 may correct the cylinder pressure of the work tool cylinder (boom cylinder 16 and tilt cylinder 19) that drives at least one work tool of bucket 6 and boom 14 to calculate the corrected pressure, and then, calculate the instantaneous load in bucket 6 based on the corrected pressure.

Also the above embodiment has been described with regard to the case where controllers 30 and 70 correct the boom pressure so as to be set at a reference value when controllers 30 and 70 distinguish the work phase as excavation, as shown in FIGS. 8 and 9. The present disclosure is not limited to the above, but controllers 30 and 70 may correct the cylinder pressure of the work tool cylinder (boom cylinder 16 and tilt cylinder 19) that drives at least work tool of bucket 6 and boom 14 to be set at a reference value when controllers 30 and 70 distinguish the work phase as excavation.

Also the above embodiment has been described with regard to the case where, when controllers 30 and 70 distinguish the work phase as excavation, controllers 30 and 70 subtract the traction pressure from the boom pressure to correct the boom pressure so as to calculate the corrected pressure, as shown in FIG. 9. The present disclosure is not limited to the above, but, when controllers 30 and 70 distinguish the work phase as excavation, controllers 30 and 70 may subtract the traction pressure from the cylinder pressure of the work tool cylinder (boom cylinder 16 and tilt cylinder 19) that drives at least one of bucket 6 and boom 14 to thereby correct the cylinder pressure so as to calculate the corrected pressure.

Although the above embodiment has been described with regard to the case where functional blocks 30a to 30j shown in FIG. 3 are included in first processor 30, these functional blocks 30a to 30j may be included in second processor 70 shown in FIG. 2. In this case, the sensing signal from each of forward and rearward movement switching apparatus 49, vehicle speed detection unit 27, first hydraulic pressure detectors 28a and 28b, first angle detector 29, and second angle detector 48 may be output to second processor 70 through output unit 45 shown in FIG. 2.

In addition, boom operation apparatus 52 and bucket operation apparatus 54 may be an integrated steering lever (single lever). In this case, one steering lever serves as both boom operation apparatus 52 and bucket operation apparatus 54.

Second processor 70 shown in FIG. 2 may receive and transmit an electric/radio signal to and from output unit 45 over a controller area network (CAN), a local area network (LAN), a wireless LAN and the like.

Second processor 70 may receive the input information of first processor 30 and perform computation.

In the embodiment above, wheel loader 1 shown in FIG. 1 has been described as a work machine to which the configuration of the above-described embodiment is applied. However, in addition to wheel loader 1, the work machine to which the configuration of the above-described embodiment is applied may be a work machine including bucket 6 or may be a backhoe loader, for example.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 wheel loader; 2 vehicular body frame; 3 work implement; 4 traveling unit; 4a front wheel; 4b rear wheel; 5 cab; 6 bucket; 6a cutting edge; 10 boom pin; 11 front frame; 12 rear frame; 13 steering cylinder; 14 boom; 15 tilt rod; 16 boom cylinder; 17 bucket pin; 18 bell crank; 18a support pin; 19 tilt cylinder; 20 engine; 21 input shaft; 22 motive power extraction unit; 23 motive power transmission mechanism; 23a output shaft; 24 cylinder driving unit; 25 work implement pump; 26 control valve; 27 vehicle speed detection unit; 28a, 28b, 34 pressure sensor; 29 first angle detector; 30 first processor; 30a work phase distinction unit; 30b boom pressure correction unit; 30c load weight calculation unit; 30d traction pressure calculation unit; 30e load weight output unit; 30f load weight summation unit; 30g summation value output unit; 30h boom angle sensing unit; 30i differential pressure sensing unit; 30j storage unit; 32 rotation sensor; 33 sensor; 40, 75 display unit; 45 output unit; 48 second angle detector; 49 forward and rearward movement switching apparatus; 49a forward and rearward movement switching operation member; 49b forward and rearward movement switching detection sensor; 51 accelerator operation apparatus; 51*a* accelerator operation member; 51*b* accelerator operation detection unit; 52 boom operation apparatus; 52*a* boom operation member; 52*b* boom operation detection unit; 53 speed change operation apparatus; 53*a* speed change operation member; 53*b* speed change operation detection unit; 54 bucket operation apparatus; 54*a* bucket operation member; 54*b* bucket operation detection unit; 58 brake operation apparatus; 58*a* brake operation member; 58*b* brake operation detection unit; 70 second processor; 71 input unit; 100 excavated object; 200 dump truck.

The invention claimed is:

1. A work machine comprising:
   a work implement including a bucket, a boom that raises and lowers the bucket, and a work tool cylinder that drives at least one of the bucket and the boom;
   a work phase sensor that senses information about a work phase including excavation;
   a cylinder pressure sensor that senses cylinder pressure of the work tool cylinder; and
   a controller that distinguishes the work phase by the work implement based on the information sensed by the work phase sensor, and switches correction of the cylinder pressure sensed by the cylinder pressure sensor when distinction of excavation in the work phase switches.

2. The work machine according to claim 1, wherein
   when the controller distinguishes the work phase as excavation, the controller corrects the cylinder pressure to calculate corrected pressure of the work tool cylinder, and calculates an instantaneous load in the bucket based on the corrected pressure.

3. The work machine according to claim 2, further comprising:
   a vehicular body; and
   a plurality of wheels attached to the vehicular body.

4. The work machine according to claim 3, wherein
   the work phase includes loaded rearward movement after excavation, and
   the controller switches correction of the cylinder pressure when the work phase switches from excavation to loaded rearward movement.

5. The work machine according to claim 4, wherein
   when the controller distinguishes the work phase as excavation, the controller corrects the cylinder pressure to be set at a reference value to calculate the instantaneous load based on the corrected pressure, and
   when the controller distinguishes the work phase as loaded rearward movement after excavation, the controller calculates the instantaneous load based on the cylinder pressure.

6. The work machine according to claim 5, wherein
   the controller corrects the cylinder pressure to be set at the reference value for an entire time period during which the controller distinguishes the work phase as excavation.

7. The work machine according to claim 4, further comprising a traction sensor that senses information about traction of the plurality of wheels, wherein
   when the controller distinguishes the work phase as excavation, the controller calculates traction pressure included in the cylinder pressure based on the information about the traction sensed by the traction sensor, and subtracts the traction pressure from the cylinder pressure to correct the cylinder pressure to calculate the corrected pressure.

8. The work machine according to claim 4, further comprising a display or a speaker that gives a notification about the instantaneous load calculated by the controller.

9. The work machine according to claim 8, wherein
   the display or the speaker is a display, and
   when the controller distinguishes that loaded rearward movement after excavation is started as a work phase, the controller causes the display to show the instantaneous load as a current load value in real time, the instantaneous load being calculated based on the cylinder pressure.

10. The work machine according to claim 9, wherein
    the controller causes the display to continuously show the instantaneous load as a load weight from a time point when switching from loaded rearward movement to loaded forward movement is sensed to a time point when loading is sensed, the instantaneous load being calculated at a time point when the work phase is switched from loaded rearward movement to loaded forward movement.

11. The work machine according to claim 10, wherein
    the display
    shows a target load weight in the bucket when the work phase is distinguished as excavation,
    shows the instantaneous load in the bucket when the work phase is distinguished as loaded rearward movement after excavation,
    continuously shows the instantaneous load as a load weight from a time point when switching from loaded rearward movement to loaded forward movement is sensed to a time point when loading is sensed, the instantaneous load being calculated at a time point when the work phase is switched from loaded rearward movement to loaded forward movement, and
    when the work phase is distinguished as loading, shows a summation value of load weights loaded onto an object to be loaded with a load and a difference obtained by subtracting the summation value of the load weights from a loadable capacity in the object to be loaded with a load.

12. The work machine according to claim 8, wherein
    after the controller subjects the cylinder pressure sensed by the cylinder pressure sensor to a smoothing process, the controller corrects the cylinder pressure.

13. The work machine according to claim 1, wherein
    after the controller subjects the cylinder pressure sensed by the cylinder pressure sensor to a smoothing process, the controller corrects the cylinder pressure.

14. A work machine comprising:
    a vehicular body;
    a plurality of wheels attached to the vehicular body;
    a work implement including a bucket, a boom that raises and lowers the bucket, and a work tool cylinder that drives at least one of the bucket and the boom;
    a traction sensor that senses information about traction of the plurality of wheels;
    a cylinder pressure sensor that senses cylinder pressure of the work tool cylinder; and
    a controller that calculates an instantaneous load in the bucket based on the information about the traction sensed by the traction sensor and the cylinder pressure.

15. The work machine according to claim 14, wherein
    the controller calculates traction pressure included in the cylinder pressure based on the information about the traction sensed by the traction sensor, subtracts the traction pressure from the cylinder pressure to correct the cylinder pressure to calculate corrected pressure of the work tool cylinder, and calculates the instantaneous load in the bucket based on the corrected pressure.

16. The work machine according to claim 14, further comprising a work phase sensor that senses information about a work phase including excavation.

17. The work machine according to claim 14, further comprising a display or a speaker that gives a notification about the instantaneous load calculated by the controller.

18. The work machine according to claim 17, wherein the display or the speaker is a display, and
when the controller distinguishes that loaded rearward movement after excavation is started as a work phase, the controller causes the display to show the instantaneous load as a current load value in real time, the instantaneous load being calculated based on the cylinder pressure.

19. The work machine according to claim 18, wherein the controller causes the display to continuously show the instantaneous load as a load weight from a time point when switching from loaded rearward movement to loaded forward movement is sensed to a time point when loading is sensed, the instantaneous load being calculated at a time point when the work phase is switched from loaded rearward movement to loaded forward movement.

20. The work machine according to claim 19, wherein the display
shows a target load weight in the bucket when the work phase is distinguished as excavation,
shows the instantaneous load in the bucket when the work phase is distinguished as loaded rearward movement after excavation,
continuously shows the instantaneous load as a load weight from a time point when switching from loaded rearward movement to loaded forward movement is sensed to a time point when loading is sensed, the instantaneous load being calculated at a time point when the work phase is switched from loaded rearward movement to loaded forward movement, and
when the work phase is distinguished as loading, shows a summation value of load weights loaded onto an object to be loaded with a load and a difference obtained by subtracting the summation value of the load weights from a loadable capacity in the object to be loaded with a load.

21. A work machine comprising:
a work implement including a bucket, a boom that raises and lowers the bucket, and a work tool cylinder that drives at least one of the bucket and the boom;
a work phase sensor that senses information about a work phase including excavation;
a cylinder pressure sensor that senses cylinder pressure of the work tool cylinder;
a display that shows a load in the bucket; and
a controller that distinguishes the work phase by the work implement based on the information sensed by the work phase sensor, causes the display to show a reference value before distinction of excavation in the work phase switches, and causes the display to show a load calculated based on the cylinder pressure after distinction of excavation in the work phase switches.

22. The work machine according to claim 21, wherein the reference value is a prescribed value or an invalid value.

23. A system including a work machine, the system comprising:
a work implement including a bucket, a boom that raises and lowers the bucket, and a work tool cylinder that drives at least one of the bucket and the boom;
a work phase sensor that senses information about a work phase including excavation;
a cylinder pressure sensor that senses cylinder pressure of the work tool cylinder; and
a controller that distinguishes the work phase by the work implement based on the information sensed by the work phase sensor, and switches correction of the cylinder pressure when distinction of excavation in the work phase switches.

24. A system including a work machine, the system comprising:
a vehicular body;
a plurality of wheels attached to the vehicular body;
a work implement including a bucket, a boom that raises and lowers the bucket, and a work tool cylinder that drives at least one of the bucket and the boom;
a traction sensor that senses information about traction of the plurality of wheels;
a cylinder pressure sensor that senses cylinder pressure of the work tool cylinder; and
a controller that calculates traction pressure included in the cylinder pressure based on the information about the traction sensed by the traction sensor, subtracts the traction pressure from the cylinder pressure to correct the cylinder pressure to calculate corrected pressure of the work tool cylinder, and calculates an instantaneous load in the bucket based on the corrected pressure.

* * * * *